US007552589B2

(12) United States Patent
Mok

(10) Patent No.: US 7,552,589 B2
(45) Date of Patent: Jun. 30, 2009

(54) STRUCTURE AND METHODS USING MULTI-SYSTEMS FOR ELECTRICITY GENERATION AND WATER DESALINATION

(75) Inventor: Siong Cheak Mok, Singapore (SG)

(73) Assignee: MSC Power (S) Pte Ltd., Singapore (SG)

(*) Notice: Subject to any disclaimer, the term of this patent is extended or adjusted under 35 U.S.C. 154(b) by 372 days.

(21) Appl. No.: 11/552,097

(22) Filed: Oct. 23, 2006

(65) Prior Publication Data

US 2007/0245730 A1   Oct. 25, 2007

Related U.S. Application Data

(63) Continuation of application No. PCT/SG2004/000105, filed on Apr. 23, 2004.

(51) Int. Cl.
F03G 6/00 (2006.01)
F24J 2/08 (2006.01)

(52) U.S. Cl. .................. 60/641.15; 60/641.8; 126/683; 415/907

(58) Field of Classification Search ............... 60/641.8, 60/641.12, 641.15, 398
See application file for complete search history.

(56) References Cited

U.S. PATENT DOCUMENTS

| 4,184,481 A | * | 1/1980 | Tornquist | 126/585 |
| 4,723,826 A | | 2/1988 | Whitaker | |
| 5,983,634 A | * | 11/1999 | Drucker | 60/398 |

FOREIGN PATENT DOCUMENTS

| DE | 3407881 | | 9/1985 |
| DE | 3407881 A | * | 9/1985 |
| GB | 2009391 | | 6/1979 |
| WO | WO 9911925 | | 3/1999 |
| WO | WO 9911927 | | 3/1999 |

OTHER PUBLICATIONS

International Search Report pertaining to related app. No. PCT/SG2004/000105; 5 pp; Jan. 12, 2005.
Written Opinion pertaining to related app. No. PCT/SG2004/000105; 6 pages; Jul. 17, 2006.
International Preliminary Report on Patentability pertaining to related app. No. PCT/SG2004/000105.

* cited by examiner

Primary Examiner—Thomas E Denion
Assistant Examiner—Christopher Jetton
(74) Attorney, Agent, or Firm—Hancock Hughey LLP

(57) ABSTRACT

A pyramid-like structure consisting of a base and 3 or more side frames, each side frame forming an angle to the base. The pyramid-like structure having an enclosed space within and including a way to collect solar energy and to collect and transfer thermal energy from the sun; air suction mechanisms to take surrounding air into the enclosed space; a plurality of wind turbines; a Main Thermal Reservoir to take in and hold heat transfer medium, which is heated therein and then pumped to the top day tanks. The heat transfer medium is heated by a Heat Absorption and Transfer Layer through a network of pipes on the side frame back to the Main Thermal Reservoir, wherein thermal energy is collected, absorbed and transferred to the enclosed space of the pyramid, heating the enclosed space and within the air suction means, causing a temperature differential between the surrounding air and heated air inside the enclosed space of the pyramid to create a continuous flow of the heated air to turn the wind turbines. If desired, the thermal energy can be used to by a desalination system to process seawater into potable water.

44 Claims, 10 Drawing Sheets

Layer 3 sheet metal as base material for heating, absorbing and transfer heat upwards Heat from bottom rises up as it gets hotter but base is larger than the top, so heat is build up and forced to congregrate together forming a HOT SPOT

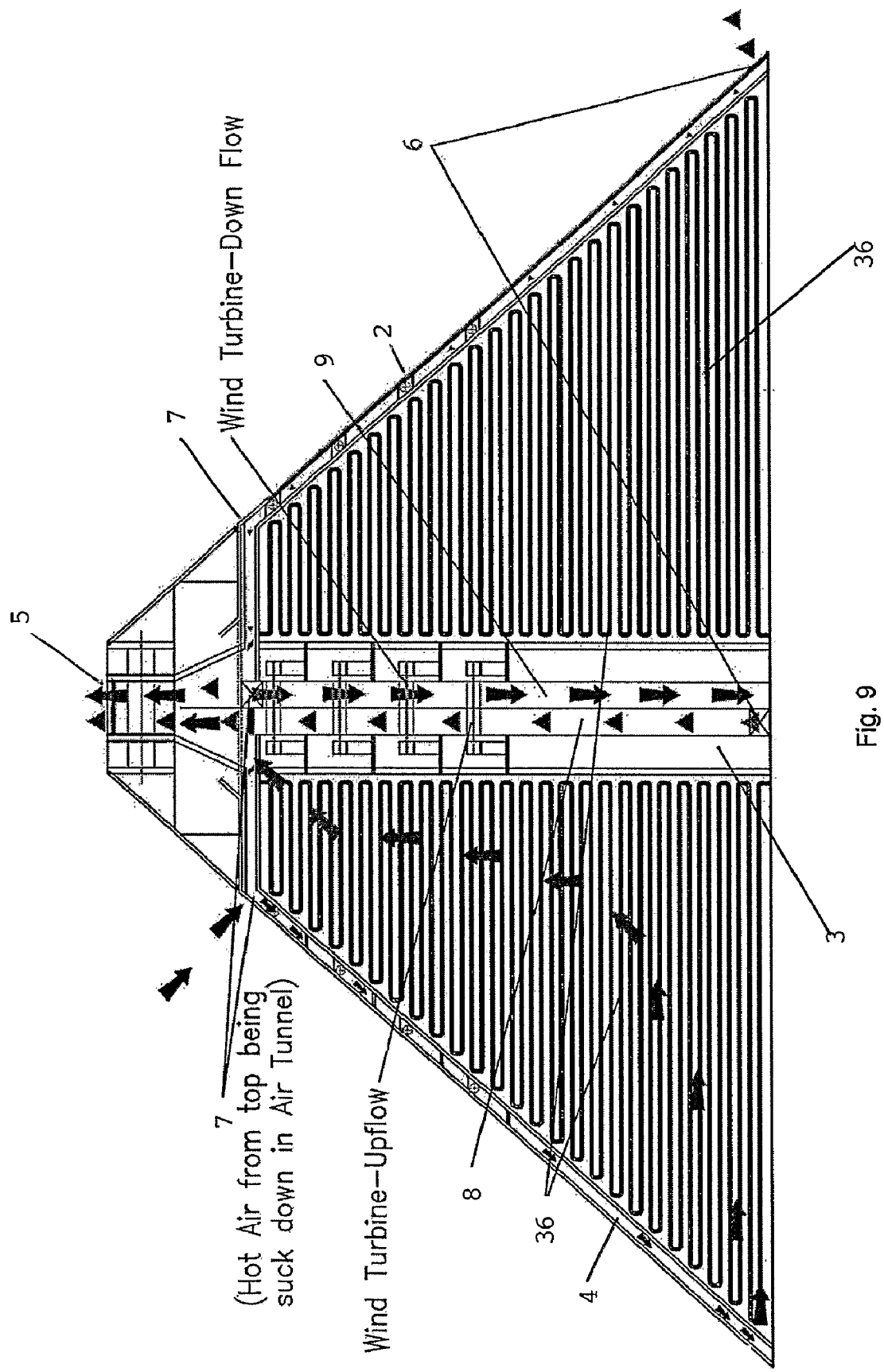

STRUCTURE AND METHODS USING MULTI-SYSTEMS FOR ELECTRICITY GENERATION AND WATER DESALINATION

International Application No. PCT/SG2004/000105 is hereby incorporated by reference

FIELD OF INVENTION

This invention relates to a continuous 24/7 pyramid-like structure with multi-systems for generation of electricity and desalination of seawater to obtain potable/drinking water wherein the electricity is generated by hot air moving through Wind Turbine, by Gas Turbine and solar energy from Solar panels and the desalination is carried out, using the heat collected in the Main Thermal Reservoir and steam from the boiler on top of the pyramid-like structure.

BACKGROUND OF INVENTION

Conversion of solar energy to thermal or electrical energy through the use of systems such as photovoltaic arrays, passive absorbers of solar energy, solar furnaces, through concentrating collectors with sun trackers is well established in the art.

Systems have also been proposed for simultaneously converting solar energy to thermal and electrical power.

Other systems attempting to optimize electrical energy conversion and provide conversion to thermal-energy from solar energy have been-proposed.

Systems for desalination have also been proposed.

However, existing patents and inventions proposing use of thermal energy either cater to large scale commercial generation of power or cater to a small scale. Existing inventions are not scalable unlike the subject invention which either be for large scale generation of electricity or scalable to generate power for a single building or a condominium. These existing inventions also do not adopt a multi-system approach to maximise use of all the available thermal and solar energy. Some of the existing inventions also depend solely on the sun to provide the solar energy and therefore cannot operate at night.

There are many arid areas in the world which are near the sea and where the sun is always available. There is therefore a need for an invention that maximizes the use of the thermal energy of the sun not only to generate power but to make potable water at the same time. There is also a requirement for such an invention to have large scale commercial systems so as to generate power and to process sea water changing it into potable water, on a continuous basis. At the same time, there is a requirement for a power generator which uses a multi-system approach to maximize the harvesting of solar and thermal energy from the sun.

SUMMARY OF INVENTION

A first object of the invention is a pyramid-like structure consisting of a base and 3 or more side frames, each side frame forming an angle to the base, the pyramid-like structure having an enclosed space within, the pyramid-like structure having:—
- a collector of solar energy;
- an accumulator-conductor of thermal energy;
- an air suction means to take surrounding air into the enclosed space;
- a plurality of wind turbines;
- a system for storage, circulation and heating of a Heat Transfer Medium from a Main Thermal Reservoir up to a plurality of Day tanks near the top of the pyramid-like structure and then down through the accumulators and conductors of thermal energy;
- a boiler system; and
- a system of controls for working of the pyramid-like structure for the collection of thermal energy by the accumulator-conductor of thermal energy, said thermal energy transferred by the accumulator-conductor to heat the Heat Transfer Medium and to heat the air within the enclosed space of the pyramid as well as heat the air within the air suction means, causing a temperature differential between the surrounding air and heated air inside the enclosed space of the pyramid, creating a continuous flow of heated air to turn the wind turbines to generate electricity for distribution/sale and the thermal and solar energy can be used by a desalination system to turn seawater into potable water.

Advantageously, the accumulator-conductor consisting of at least three layers of heat absorbing materials and a bottom layer of heat retention material, the three layers of heat absorbing materials being a $1^{st}$ Heating Layer as the outermost layer, a $2^{nd}$ Heat Transfer Layer below the $1^{st}$ Heating Layer, a $3^{rd}$ Heat Absorption and transfer Layer below the $2^{nd}$ Heat Transfer Layer, and a bottom layer of heat retention material being a $4^{th}$ Heat retention Layer.

Advantageously, the collector of solar energy consists of the $1^{st}$ Heating Layer 1 and is a layer of glass panels integrated with solar cells.

Advantageously, the $1^{st}$ Heating Layer is made of glass panels or other transparent material such as transparent polycarbonate, integrated with solar cells.

Alternatively, the $1^{st}$ Heating Layer is made of glass panels or other transparent material such as transparent polycarbonate, integrated with convex lenses to concentrate light beams.

Advantageously, the $2^{nd}$ Heat Transfer Layer consists of a network of metal pipes, wherein one pipe could be used to carry heat transfer medium, another pipe for carrying treated water and another pipe for carrying other heat transfer fluids.

Advantageously, the $3^{rd}$ Heat Absorption and Transfer Layer is made of thermal conductive metal plates with the best heat absorption and transfer characteristic.

Advantageously, the $4^{th}$ Heat retention Layer is made of insulation materials to absorb thermal heat transferred from the $1^{st}$ Heating Layer, $2^{nd}$ Heat Transfer Layer and $3^{rd}$ Heat Absorption and Transfer Layer.

Advantageously, the $1^{st}$ Heating Layer, the $2^{nd}$ Heat Transfer Layer, the $3^{rd}$ Heat Absorption and Transfer Layer and the $4^{th}$ Heat Retention Layer forms part of the cross section of the side frame.

Preferably, the air suction means consists of a Vertical Main Air Shaft and a side air shaft on each side frame and a cool air tunnel along the Main Thermal Reservoir.

Preferably, the Vertical Main Air Shaft has a top end near the top of the pyramid-like structure, a mid-section having a plurality of wind turbines and an enlarged circular base, also having a large wind turbine.

Preferably, the Vertical Main Air Shaft of the air suction means, has a top end which is cone-shaped and has automated louvers.

Preferably, the top end of the Vertical Main Air Shaft is located within a hot plate.

Preferably, the top end of the Vertical Main Air Shaft leads through the hot plate, to a Main Air Vent.

Preferably the enlarged circular base of the Vertical Main Air Shaft is in the form of an inverted spiral staircase, the spiral staircase formed at an angle of 30-45 degrees side ways or perpendicular to the Turbine blades of the large wind turbine at the base.

Preferably the Side Air Shaft has a vent for intake of cool air tunnel connected to a cool air tunnel for passage of cool air and a vent for intake of hot air connected to a hot air tunnel for passage of hot air.

Preferably, the cool air tunnel and hot air tunnel has plurality of wind turbines spaced apart to generate electricity as the air passes through the tunnels.

Preferably, the air tunnels being constructed of concrete or steel.

Advantageously, the cool air tunnel along the main Thermal Reservoir for the pyramid-like structure has cool air vents for intake of cool air from the surrounding, a mid section of the cool air tunnel laid along the Main Thermal Reservoir and which then leads to a vertical air tunnel in the enclosed space of the pyramid-like, said vertical air tunnel passing through a hot air chamber before exiting through a hot air exit near the top of the pyramid-like structure.

Advantageously, the system for storage, circulation and heating of a Heat Transfer Medium consists of a Main Thermal Reservoir connected to a plurality of Pre-Heat Side Tanks, Balancing Tank and an intake for Heat Transfer Medium and a pipe and pumps to circulate the Heat Transfer Medium up to a plurality of Day Tanks near the top of the pyramid-like structure and down from the Day tanks through the network of pipes of $2^{nd}$ Heat Transfer Layer, the Heat Transfer Medium absorbing thermal energy and also transferring thermal energy from the $1^{st}$ Heating Layer to the $3^{rd}$ Heat Absorption and Transfer Layer, before the Heat transfer Medium flows back to the Main Thermal Reservoir.

Preferably, the Main Thermal Reservoir is located at the base of the pyramid-like structure.

Preferably, the Main Thermal Reservoir is located at the base of the pyramid-like structure and directly below the enlarged circular base of the Vertical Main Air Shaft.

Preferably, the Main Thermal Reservoir has steel plates placed strategically so that air flowing through the Main Thermal reservoir and upwards through the Vertical Main Air Shaft is caused to be turbulent n a semi-circular motion creating a hurricane like motion moving upwards the enlarged circular base of the Vertical Main Air Shaft.

Advantageously, the network of pipes consists of pipes for heat transfer medium such as fresh water and pipes for other heat transfer fluids.

Preferably, the network of pipes consists of pipes for heat transfer medium such as fresh water and pipes for other heat transfer fluids being laid side by side within $1^{st}$ Heating Layer and $3^{rd}$ Heat Absorption and Transfer Layer inside the side frame.

Preferably, the network of pipes consisting of pipes for heat transfer medium such as fresh water and pipes for heat transfer fluids being laid side by side in a ziz-zag pattern within Layer 1 and Layer 3 of the side frame so as to maximize the time taken for the heat transfer medium such as fresh water and other heat transfer fluids to flow through the pipes.

Advantageously, the Heat Transfer Medium is fresh water or treated water.

Alternatively, the Heat Transfer Medium can be any liquid with good thermal retention characteristics.

Advantageously, the boiler system consists of a boiler on top of a hot plate and a steam chamber for receiving the steam produced by the boiler for further use of the steam by a steam generator, for power production or by a desalination system, for processing of seawater into potable water.

Preferably, the boiler system has a plurality of external parabolic reflectors near the base of pyramid-like structure positioned so that sunlight is directed towards the hot plate to heat the Heat transfer medium in the boiler.

Advantageously, the hot plate is a flat horizontal area containing the boiler system and control systems.

Advantageously, the system of controls consisting of controls for movement of air, movement of Heat transfer Medium, seawater and potable water and controls for monitoring the operation of the various systems and temperature of the heat transfer medium, surrounding air, seawater and other heat transfer fluids.

Preferably, the controls for movement of air including automated louvers.

Preferably, the controls for movement of heat transfer medium and other heat transfer fluids and water including pumps and flow regulators.

Preferably, the system of controls are operated with instructions from a computer or other electrical/electronic devices.

Advantageously, the wind turbines include mini-turbines installed space apart in the hot air tunnels and cool air tunnels, wind turbines of various sizes located at intervals in the mid section of the Vertical Main Air Shaft and a Main Booster fan at the exit of the top end of the Vertical Main Air Shaft.

A second object of the invention is a First Air Heating Method for generating electricity for the pyramid-like structure, the method consisting of:— taking cool air from the surrounding through the cool air vents into the cool air tunnels;

taking warm air from the surrounding through the hot air vents into the hot air tunnels;

the cool air being heated up in the cool air tunnels by the heat transferred from $1^{st}$ Heating Layer and heat from $3^{rd}$ Heat Absorption and transfer Layer;

the warm air being heated up in the hot air tunnels by the heat transferred from $1^{st}$ Heating Layer and heat from $3^{rd}$ Heat absorption and transfer Layer;

the heated air exiting from the cool air tunnels and hot air tunnels at the base of the pyramid-like structure, the heated air rising upwards in the enclosed space of the pyramid-like structure, the heated air further heated by the heat retained in $4^{th}$ Heat retention Layer within the Side Frame;

the heated air finally congregating near the hot plate, causing a temperature differential between the heated air near the hot plate and the surrounding air outside the pyramid-like structure;

the temperature differential creating a continuous flow of hot air into the hot air tunnels and cool air tunnels, turning the mini-turbines in the hot air tunnels and cool air tunnels.

Advantageously, the hot air exits through louvres at the hot plate passes through wind turbines and a Main Booster fan further generating electricity.

Preferably, the louvres at the hot plate for passage of exit of hot air are controlled by the controls for movement of air.

A third object of the invention is a Second Air Heating Method for generating electricity in a pyramid-like structure comprising the steps of:— taking heat transfer medium through a intake to a main thermal reservoir at the base of the pyramid to hold the heat transfer medium;

said thermal reservoir having heat fins on its sides and on its top;

taking cool air from the exterior of the pyramid structure through a plurality of cool air intake vents installed around the base of the structure;

passing the cool air through a series of heat fins on a plurality of preheat side tanks at each side of the base of the pyramid;

said preheat side tanks connected to the main thermal reservoir and having heat fins on its sides and on its top;

said hot air converging into the inverted spiral staircase of the Vertical Main Air Shaft, creating an air turbulence, hot air exiting from the inverted spiral staircase at an angle of 30-45 Degrees sideways to the turbine blades in the Vertical Main Air Shaft, to turn the wind powered turbines in the Vertical Main Air Shaft for the generation of electricity;

the hot air after passing through the turbine in the inverted spiral staircase further passing through the mid-section of the Vertical Main Air Shaft having a plurality of wind turbines, further turning the plurality of wind turbines for generation of additional electricity before the hot air exits from the top of the Vertical Main Air Shaft.

Preferably, the hot air exiting from the top of the Vertical Main Air Shaft is further sucked out by a Main Booster Fan on the top of the pyramid-like structure.

A Fourth object of the Invention is a Third Air Heating Method for generating electricity for the pyramid-like structure, the method consisting of:— taking cool air from the surrounding through the cool air vents into the cool air tunnels;

the cool air being heated up in the cool air tunnels located along the Main Thermal Reservoir;

the heated air rising vertically upwards in the vertical portion of the cool air tunnels within the enclosed space of the pyramid-like structure, further heated by the heating fins in the enclosed space of the pyramid-like structure;

the heated air finally congregating near a hot air chamber beneath the hot plate, before exiting a hot air exit, causing a temperature differential between the heated air near the hot plate and the surrounding air outside the pyramid-like structure;

the temperature differential creating a continuous flow of cool air into the cool air tunnels, turning an alternator at the hot air exit, to generate electricity.

Advantageously, during the transition period from the early dawn to when the sun begins to rise, warm heat transfer medium from the Main Thermal Reservoir is pumped up to the top of the pyramid-like structure and then allowed to flow down the network of pipes to start heating up the steel and/or aluminum of the 3$^{rd}$ Heat Absorption and Transfer Layer within the side frame, to shorten the time for the sun to heat up the pyramid-like structure and improve efficiency of the First Air Heating Method and Second Air Heating Method.

Advantageously, the First Air Heating Method, Second Air Heating Method and Third Air Heating Method works independently of each other.

Advantageously, the pyramid-like structure has a side which is angled from 30% to 80% as measured from the base, depending on location of the pyramid-like structure and sun's maximum azimuth.

Preferably, the pyramid-like structure should be angled from 35% to 55% as measured from the base, depending on location of the pyramid-like structure and sun's maximum azimuth.

Advantageously, the pyramid-like structure is scalable to generate electricity and potable water for a buildings of various sizes ranging from a single building to a condominium, and from a township to an entire city.

BRIEF DESCRIPTION OF DRAWINGS

FIG. 9 is a diagrammatic representation of the movement of hot air and cool air through the side air shafts and within the Vertical Main Air Shaft.

DESCRIPTION OF THE PREFERRED EMBODIMENTS

An embodiment of the present invention will now be described with reference to the accompanying drawings.

Figure 1:
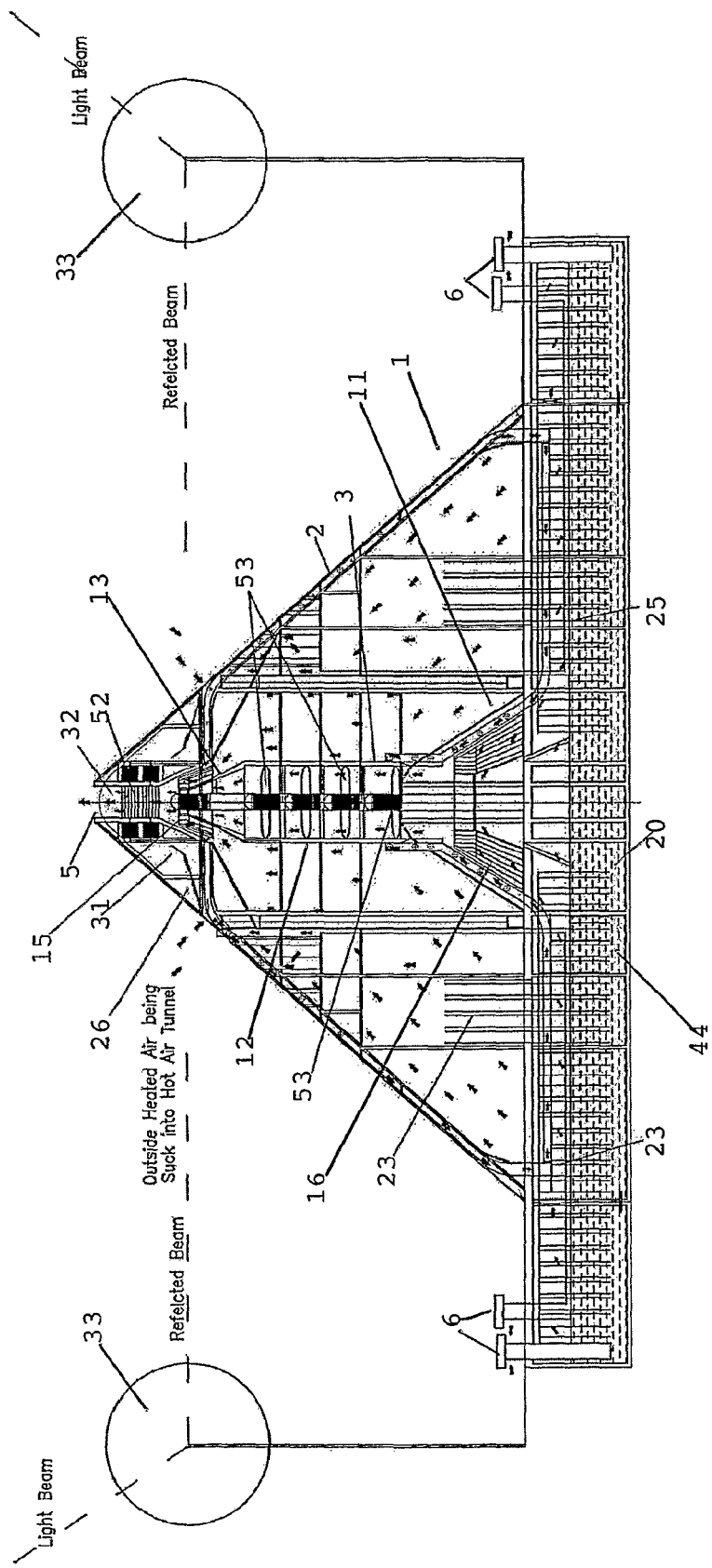
FIG. 1 is a cross section of a pyramid-like structure with multi-systems generating power according to a first embodiment of this invention.

Referring to FIG. 1, for illustration purpose, the structure described herein is a pyramid-like structure 1 with four sides and therefore four sides forming angled four side frames 2. The number of side frames 2 could vary from three side frames to eight side frames. The width of the base and height of the pyramid-like structure 1 depends on the power generation output. The foundation of the pyramid-like structure 1 consists of mild steel concrete plinths, beams and columns with steel encasing therein (hereinafter referred to as "pyramid-like structure").

In the preferred embodiment, each side frame 2 of the pyramid-like structure 1 has a multi-layered cross section having a layer of collectors of solar energy and a few layers of accumulator-conductor of thermal energy. The side frame 2 also has air suction means to take air from the surrounding atmosphere through air tunnels and a network of pipes 36 laid within the frame. For this purpose, each side frame 2 can be set at an angle from 30% to 80% as measured from the base, depending on location of the pyramid-like structure and sun's maximum azimuth.

However, the pyramid-like structure 1 should preferably be angled from 35% to 55% as measured from the base, depending on location of the pyramid-like structure and sun's maximum azimuth.

At the base of the pyramid-like structure 1 is the Main Thermal Reservoir which consists of a Main Thermal Tank 20, Pre-Heating Side Tanks 21, Balancing Tank 22, all filled with a Heat Transfer Medium 44 such as water or other suitable heat transfer liquid taken through an intake 27. The Main Thermal Reservoir is connected to a plurality of Day Tanks 26 near the top of the pyramid-like structure 1 and a network of pipes 36, thus forming a system for storage, circulation and heating of Heat Transfer Medium. The Main Thermal Tank 20, Pre-Heating Side Tanks 21 and Balancing Tank 22 are covered with metal cover 25 to prevent evaporation of the Heat Transfer Medium into the enclosed space 34 of the pyramid-like structure 1.

Heat Transfer Medium 44 is pumped from the Main Thermal Tank 20 and/or the Pre-heating Side Tanks 21 up to the Day Tanks 26 and released through the network of pipes 36, flowing slowly, absorbing thermal energy in the $3^{rd}$ Heat Absorption Layer 42 and transferring the thermal energy to the Main Thermal Tank 20 and Preheating Side tanks 21 or releasing thermal energy into the enclosed space 34 within the pyramid-like structure during the transition period from early dawn to when the sun begins to rise.

The air suction means consists of a Vertical Main Air Shaft 3 situated over the Main Thermal Reservoir and a side air shaft 4 on each side frame 2.

The Vertical Main Air Shaft 3 is positioned in the center of the pyramid-like structure 1, with a wide circular base 11 in the form of a spiral staircase design, a cone shaped mid section 12 and a smaller top 13 with angled nozzle 14 clockwise. Cool air is taken in from the surrounding through cool air intakes 6 at the base of the pyramid-like structure, passing through the Main Thermal Tank 20, being heated by the heating fins 23 of the Main Thermal Tank. The warm Air after passing through the heating fins 23 of the Main Thermal Tanks 20 and Pre-heating Side tanks 21 then flow through the wide circular base 11 of the Vertical Main Air Shaft 3. The wide circular base 11 has a large wind turbine 16, and the mid-section 12 has at least four wind blades with alternators (turbines) 53 stacked one on top of the other and designed to ensure maximum air flow. A Main Air Vent 5 on the top of the pyramid-like structure 1 ensures a continuous air flow through the Main Thermal Tank 20 right up to the Vertical Main Air Shaft 3.

At the top of the Vertical Main Air Shaft 3 is a flat horizontal plate (referred to as "Hot Plate" 30) with a boiler system comprising a boiler 31 and a steam chamber 32.

Figure 2:
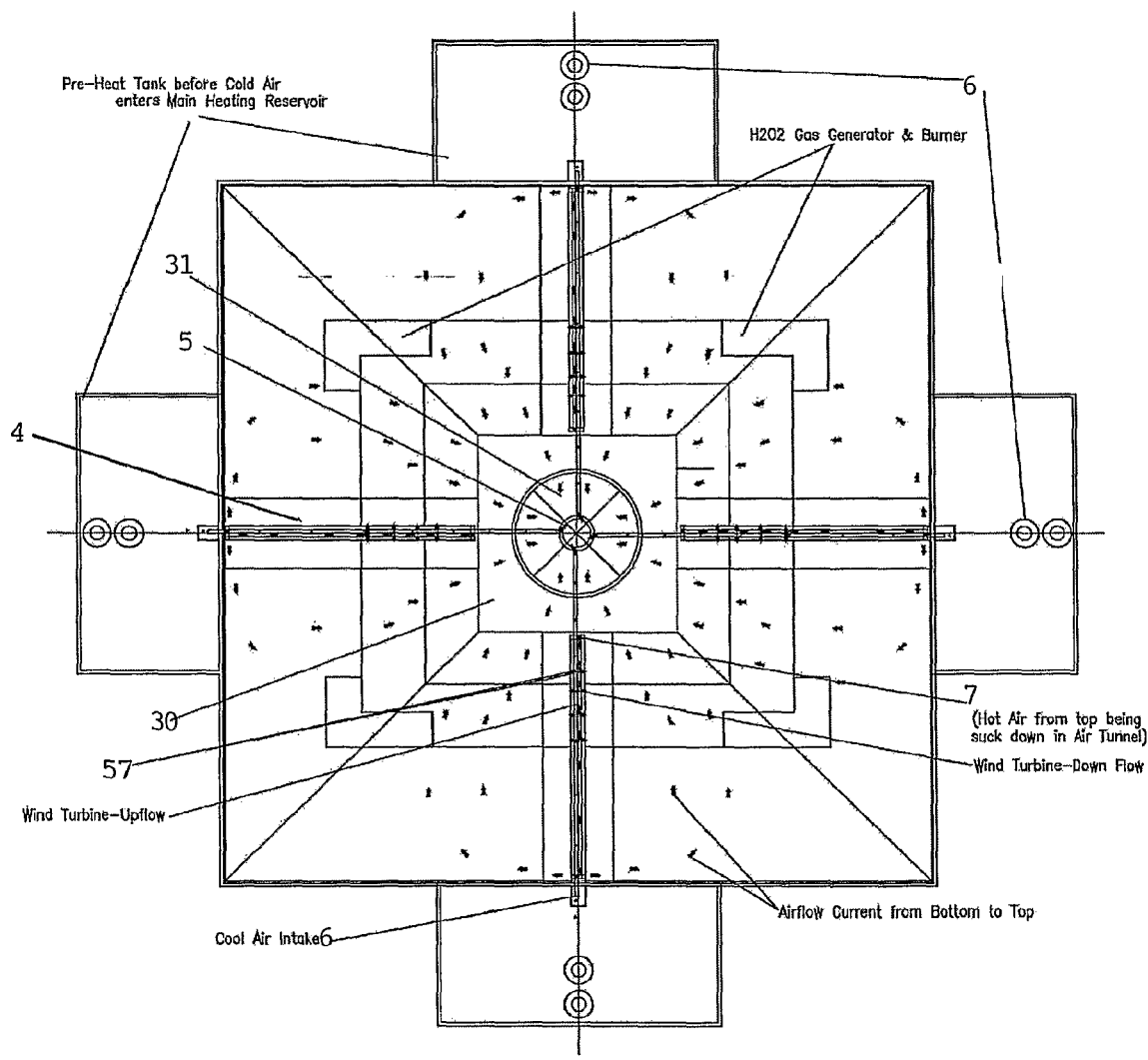
FIG. 2 is a plan view of the pyramid-like structure.

FIG. 2 shows a plan view of the structure.

The angled side frames 2 of the pyramid-like structure 1 also have hot air intake vents 7 and cool air intake vents 6. The hot air intake vent 7 leads to a hot air tunnel 9 and the cool air intake vent 6 leads to a cool air tunnel 8. Two or more hot air and cool tunnels 8,9 forming the Side air shafts 4 running within the angled side frames 2. The side air shafts 4 could either run along the mid-section or in some other pattern inside the side frame 2. Each air tunnel 8, 9 contains many mini turbines 50 and alternators 57 inside, spaced apart, along its length.

Figure 3A:
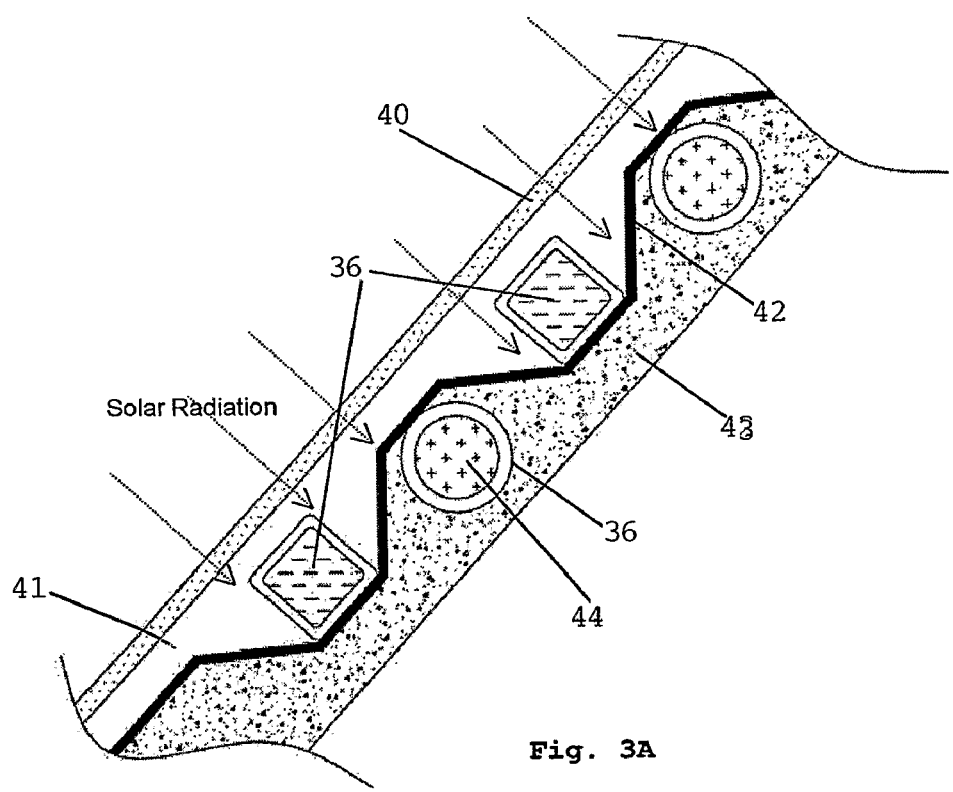
FIGS. 3A and 3B shows cross section view of two layout of the four layers of angled side frame.
Figure 3B:
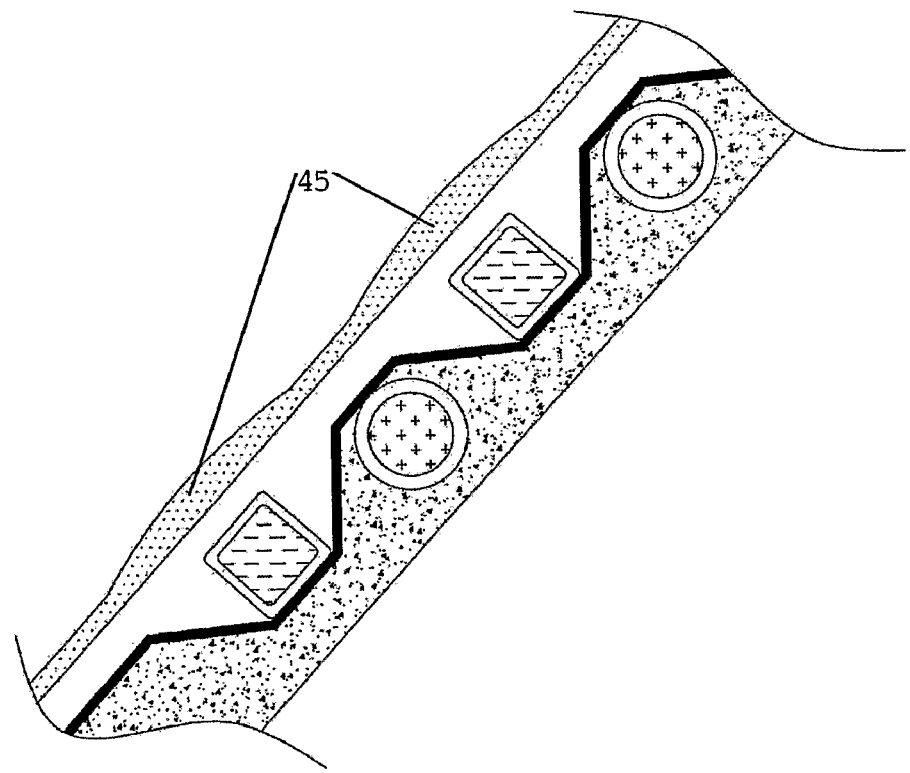

FIGS. 3A and 3B shows two versions on cross section of the side frame showing construction of the collector of solar energy and accumulator-conductor of thermal energy. In FIG. 3A, the collector of solar energy and accumulator-conductor of transmit thermal energy consists of multi Layered Panels being $1^{st}$ Layer (Heating-Layer) 40, $2^{nd}$ Layer (Heat transfer Layer) 41, $3^{rd}$ Layer (Heat Absorption and Transfer Layer) 42 and $4^{th}$ Layer (Heat Retention Layer) 43 making up the cross section of the side frame 2. A typical cross section of the side frame would show at least four panels or layers, starting from the uppermost layer to the lowermost layer:—

$1^{st}$ Layer 40 (a "Heating Layer"),
$2^{nd}$ Layer 41 (a "Heat Transfer Layer"),
$3^{rd}$ Layer 42 (a "Heat absorption and transfer Layer"), and
$4^{th}$ Layer 43 (a "Heat retention Layer")

It should be stressed that the number of layers and the type of material to be used for each layer is not to be limited and therefore could vary.

FIG. 3 A shows a cross-section of a four-layer side frame, the cross section made up as follows: —

$1^{st}$ Layer 40—"Heating Layer" made up of transparent panels;
2nd Layer 41—"Heat Transfer Layer" made up of metal pipes with flowing liquid inside the metal pipes;
$3^{rd}$ Layer 42—"Heat absorption and transfer Layer" made up of coated conductive metal, and
$4^{th}$ Layer 43—"Heat retention Layer" having heat retention material with metal pipes and non-flowing liquid FIG. 3 B shows $1^{st}$ Layer 40 (Heating Layer) made of convex lenses, the other Layers, $2^{nd}$ Layer 41 (Heat Transfer Layer), $3^{rd}$ Layer 42 (Heat absorption and transfer layer) and $4^{th}$ Layer 43 (Heat retention layer) being the same as in FIG. 7A.

Typically, $1^{st}$ Layer 40 (Heating Layer) consists of a layer of glass panels or other transparent material such as transparent polycarbonate, integrated with solar cells or convex lenses 45 to concentrate light beams.

The object for $1^{st}$ Layer (Heating Layer) 40 is to absorb Sunlight through Solar cells to produce Electricity or absorb thermal energy through convex lenses 45 acting as heat concentrator by magnification of heat source on the steel plate. In addition, $1^{st}$ Layer (Heating Layer) 40 prevents wind and breezes from carrying the collected heat away by convention.

Typically, $2^{nd}$ Layer (a "Heat Transfer Layer") consists of a network of pipes 36 made up of several sets of suitable metal pipes. Typically, one set could consist of one pipe for Heat Transfer Medium e.g. water and the other for another type of Heat Transfer Medium. Alternatively, one set could consist of a pipe for fresh water, a pipe for treated water and a third pipe for other type of Heat Transfer Medium. The pipes could also vary in diameter.

The network of pipes 36 of various diameters in Heat Transfer Layer 41 are laid on surface of $3^{rd}$ layer 42 (Heat Absorption and Transfer Layer) and spiral from the top of pyramid structure-like to the bottom, laid out in a zig-zag pattern across $3^{rd}$ Layer 42 (Heat Absorption and Transfer Layer), the pattern starting from left to right or vice versa. The zig-zag pattern is designed to maximize the time spent by the Heat Transfer Medium 44 in flowing down from the top of the pyramid-like structure 1 to the bottom. This would enable maximum amount of thermal energy could be transferred from the Heat Transfer Medium 44 (during pre-heating for morning use) or absorbed by the Heat Transfer Medium 44 (during normal day operation). $2^{nd}$ Heat Transfer Layer 41 typically has 1 or 2 sets of pipes 36—one carrying a heat transfer medium and the other treated water. The pipes 36 lead to the bottom of the pyramid structure and into one of the smaller side tanks 21 or the main underground Thermal Tank 20 which together forms the Main Thermal Reservoir. Thus, the heat from $1^{st}$ and $3^{rd}$ Heating Layer is transferred and absorbed by the Heat Transfer Medium 44 such as water in the metal pipes of $2^{nd}$ Heat Transfer Layer 41.

$3^{rd}$ Layer 42 (a "Heat Absorption and transfer layer") is typically a layer having thermal conductive metal plates like mild steel or aluminum plates or a combination of both or other suitable metals, with best heat absorption and transfer characteristic. The heat from Heat Transfer Medium 44 passing through the metal pipes 36 in $2^{nd}$ Heat Transfer Layer 41 and including heat transferred from $1^{st}$ Heating Layer 40 is absorbed and transferred to Heat Absorption and transfer layer 42 and finally transferred and absorbed by $4^{th}$ Heat Retention Layer 43. The heat from $1^{st}$ $2^{nd}$ $3^{rd}$ and $4^{th}$ Layers warms the air inside the enclosed space 34 inside the pyramid-like structure 1, the air being sucked in from cool air intake vents 8 at the bottom of the pyramid-like structure as well from hot air intake vents 7 near the top of the pyramid-like structure 1.

$3^{rd}$ Layer for Heat Absorption and transfer 42 uses thermal conductive metal plates (of various thickness) such as mild steel plates and aluminum or a combination of both or other suitable metals, to absorb, retain and transfer heat.

$4^{th}$ Layer 43 (a "Heat retention Layer") is a typically a layer having Insulation materials to absorb thermal heat transfer from outside and retention inside the pyramid-like structure. $4^{th}$ Heat retention Layer 43 has the best insulation materials to absorb heat and transfer the heat into the pyramid-like structure.

Figure 4:
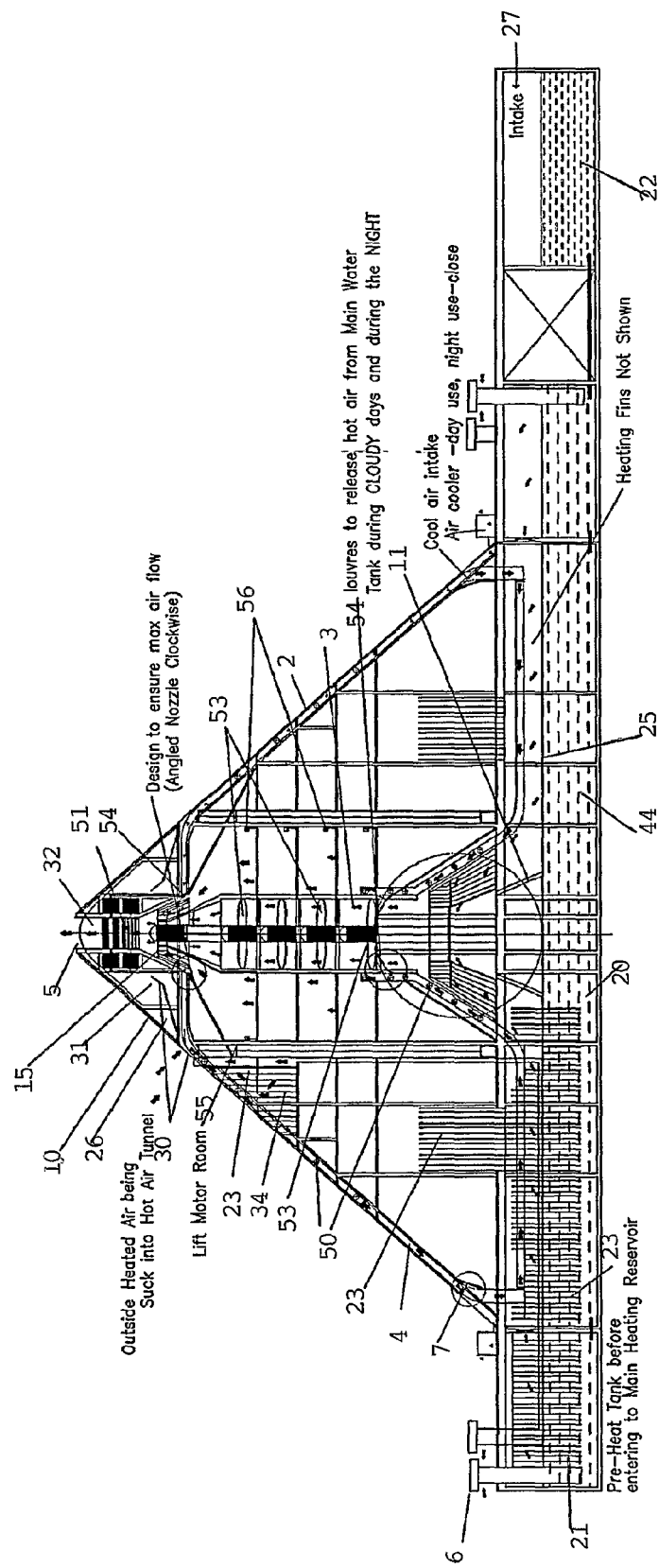
FIG. 4 is a cross sectional view of a side elevation through the center of the entire pyramid-like structure.

FIG. 4 shows a cross sectional view of a side elevation through the center of the entire pyramid-like structure 1. A description of the internal mechanisms including support and control systems within the Pyramid-like Structure 1 is now given, again by way of illustration. This invention should not be construed to be limiting in either the location of the internal mechanisms nor the number of mechanisms nor the type of mechanisms. Typically, the pyramid-like structure 1 contains at least the following means:

Main Thermal Reservoir Consisting of
1. Main Thermal Tank 20 connected to
2. Preheating Side tanks 21 of various capacities to house Heat transfer Medium 44 such as water, or other suitable fluids needed for heat transfer, retention or steam generation.
3. Heating fins 23, attached to the top of the Main Thermal Tank 20 and Side Preheating tanks 21.

Air Suction Means
4. Vertical Main Air Shaft 3; having as an enlarged base 11, with a spiral staircase housing, a coned shaped mid section 12 and a smaller top 13 with angled nozzles 14.
5. Side Air shaft 4 located within each angled side frame 2. Each side air shaft 4 has at least one tunnel for cool air 8 and one tunnel for hot air 9.
6. Main Booster Fan 15.

Power Generation Means
7. Specially designed turbine fans 51 on top 13 of Vertical Main Air Shaft 3.
8. Wind turbines or wind blades with alternators 53 of various sizes depending on capacity required located at intervals in the cone shaped mid section 12 of the Vertical Main air shaft 3 and the side air shafts 4.
9. Electrical alternators 57 and generators of various designs and rating required.

Boiler System
10. A Hot plate 30 on top of the pyramid-like structure 1 (also referred to as the "Hot Spot" being the hottest part of the pyramid-like structure 1)
11. A boiler system 31 built on the Hot Plate 30 and having a cosmetic cover 10 from the hot plate 30 to the top of the pyramid-like structure;
12. A boiler system 31 operated by $H_2O_2$ gas placed in the roof top and at the main heating tanks;
13. Steam chamber 32 to hold steam from the boiler 31 for transfer downwards to a steam turbine for power generation or to a steam heat exchanger to a desalination system to process seawater to potable water.

System of Controls for the Entire Pyramid-Like Structure
14. Electrical Panels 56, Electrical junction boxes, synchroniser, inverters and other power control equipment for electricity
15. Regulators and pumps to control and distribute flow of fluid to various parts of the structure
16. Monitoring system to co-ordinate and control all operational systems within the pyramid-like structure e.g. temperature sensors to monitor temperature differentials within the pyramid-like structure and the external and associated controls, including controls for movement of louvers for intake hot and cool air and louvers for discharge of hot air.
17. Lift Motor Room 55

The complete Main Thermal Reservoir is shown in FIG. 4. The Main Thermal Reservoir consists of a Main Thermal Tank 20 and side preheating side tanks 21 connected to a balancing tank 22 through which heat transfer medium 44 such as water comes through an intake 27 for Heat Transfer Medium 44.

The lower portion of the pyramid-like structure has openings for air vent, storage tanks for collection of Heat Transfer Medium 44 flowing down from top of the pyramid-like structure and means for power output, control means, heating means, all of which has been described earlier.

The invention can be connected to a desalination system to make use of the thermal energy and steam produced by this invention to process seawater into potable water. Details of the desalination system are not described herein as the desalination system is based on current art being and therefore outside the scope of the claims of the invention.

The pyramid-like structure 1 is designed so that three separate methods of air heating (referred herein as "The First Method of Air Heating", "The Second method of Air Heating" and "The Third method of Air Heating") would work inside the enclosed space 34 of the pyramid-like structure 1 and independently of each other.

The First Method of Air Heating utilizes the differential pressure between the hot air heated during the day inside the enclosed space 34 of the pyramid-like structure, which rises to the top of the Main Air Shaft 3 and cold air is sucked into the pyramid-like structure 1, this differential pressure forming a wind draught to drive wind turbines, to generate electricity.

The Second method of Air Heating utilizes the Heat generated from the Main

Thermal Reservoir and the hot air rising through the Main Air Shaft. The Third method of Air heating supplements the First Air Heating Method as the natural suction of fresh cool air into the Side Air shaft will be slow.

All three methods of Air Heating works independently of each other.

Besides the Three methods of Air Heating, additional heating comes about through $1^{st}$ Heating Layer 40 by use of Solar Heat to excite solar panels, creating electricity or by use of thermal energy through magnification of light rays to heat up the metal plates in $3^{rd}$ Layer Heat Absorption and transfer Layer 42.

Additional thermal energy also comes from the network of pipes 36 in $2^{nd}$ Layer during the transition period from early dawn to when the sun begins to rise. This works like this. Heat Transfer Medium 44 is pumped from the Main Thermal Tank 20 and Pre heating Side tanks 21 to the Day tanks 26 and released from the Day Tank 26 and made to flow through the network of pipes 36 back to the Main Thermal Tank 20 at the bottom of the pyramid-like structure. However the flow of Heat Transfer Medium 44 will be slowed down due to the zig-zag pattern of the pipe layout. While the Heat Transfer Medium 44 is passing through the network of pipes 36 in the side frame 2, the Heat Transfer Medium 44 heats the side frame 2 by transfer of thermal energy. The Heat Transfer Medium 44 is then allowed to flow back to the Main Thermal Tank 20 and Side tank 21, and then again up to the Day tanks 26, for further circulation and transfer of thermal energy taken from the Main Thermal reservoir.

Depending on the external ambient temperature and heat transfer from $3^{rd}$ Layer (Heat Absorption and transfer Layer 42), the Heat Transfer Medium 44 is pre-heated between 45-80° C. The pre-heated Heat Transfer Medium 44 or Heat Transfer fluid then flows into their respective underground storage tanks for further heating.

A main regulator at the bottom of the pyramid-like structure 1 controls the final flow and speed of the Heat Transfer Medium 44.

Figure 5:
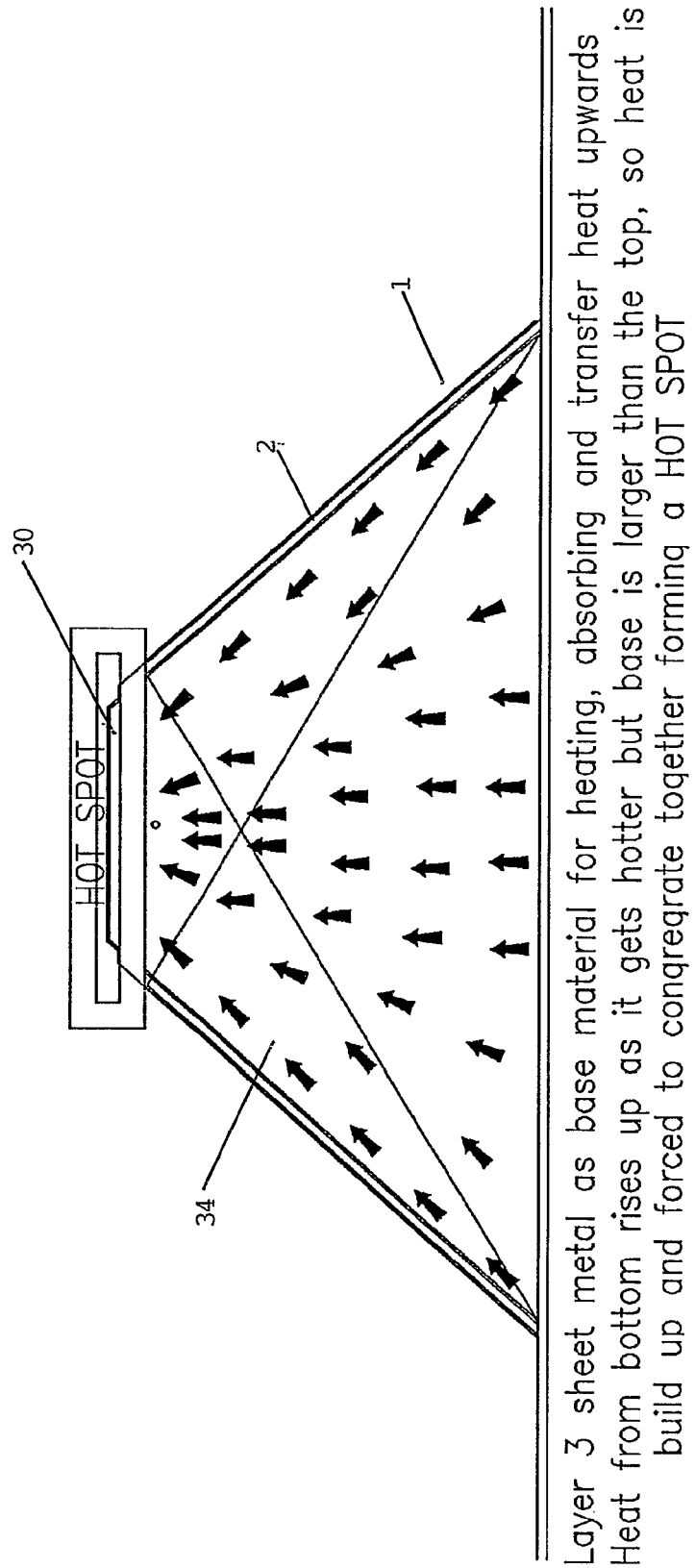
FIG. 5 is a diagrammatic representation of heat movement inside the pyramid-like structure.

The main object of $3^{rd}$ Layer (Heat Absorption and transfer Layer 42) is to absorb and transfer as much heat as possible. This is illustrated in FIG. 5 with reference to FIG. 3 and described as follows:

a. In each angled side frame 2, heat will absorbed and transfer through $1^{st}$ Layer 40 to $2^{nd}$ Layer 41 to $3^{rd}$ Layer 42 and $4^{th}$ Layer 43. The pyramid-like structure 1 would get hotter and hotter gradually, the heat within the enclosed space 34 flowing upwards as heat rises upwards to the top end of the metal side frame 2. As the sun gets hotter during the day, the heat transfer increases and the heat flow up faster. As the area of the heated side frame 2 gets proportionately smaller at the top of the pyramid-like structure, the heat concentration and temperature gradually builds up.

b. The top end of the side frame 2 is designed as a sharp ended profile in the form of a hot plate 30 and referred herein as a "Hot Spot" on which the boiler system is located. The boiler system comprises of a boiler 31 and a series of parabolic reflectors 33. The boiler 31 is built on the hot plate 30. The main object of the Hot Spot is to heat up the Heat Transfer Medium 44 such as water or other Heat transfer liquids used as Heat transfer Medium in the boiler 31 on top of the hot plate 30. The Hot plate 30 is for heating purposes during day and therefore does not work at night.

c. External parabolic reflectors 33 located on the external perimeter sides of the pyramid-like structure 1 will 'beam' concentrated sun rays on this hot plate 30 to further heat up the hot plate 30. The expected temperature of this beam is calculated to be more than 100° C. This will enable the temperature of the Heat Transfer Medium 44, in this case, water in the boiler 31, to rise beyond 100° C. and boils.

d. Water above 100° C. will boils and creates steam. This steam will be used for 2 processes—for desalination or used to drive steam turbine for additional power generation.

e. In the Desalination process, the boiler 31 can be used to create steam but flowing downwards to a steam heat exchanger and a desalination system (not shown in the drawings) to desalinate water. The desalination system is not described herein as this system is very basic and simple to construct. However, the desalination system is referred to herein since it is an auxiliary system which can be run using the thermal energy produced by this invention and also because the steam from the boiler system can be used in the desalination process.

f. For additional power generation, the steam can be used to drive a steam turbine located at the bottom of the pyramid. It is envisaged that the steam produced may not be strong enough to drive a sizeable steam turbine and additional processes will be added to supercharge the steam. A typical equipment will be a gas fired burner.

Figure 6A:
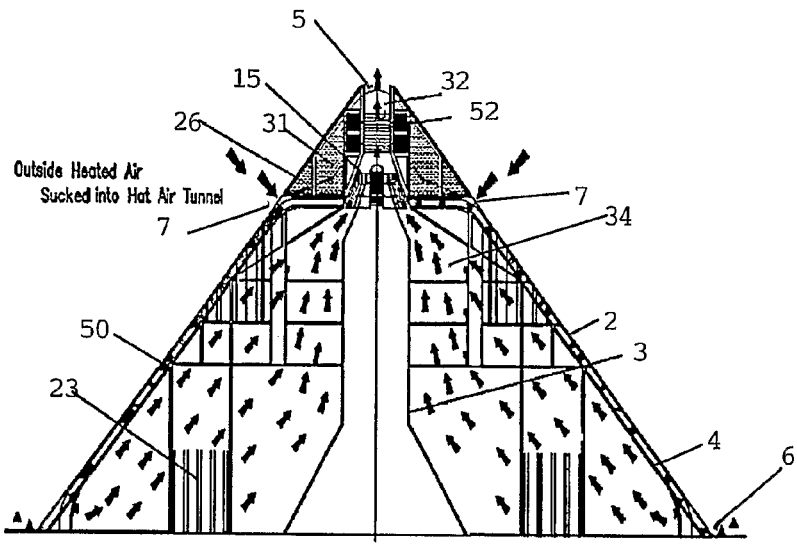
FIG. 6A is a side elevation view of the pyramid-like structure illustrating air movement described as the First method of Air Heating.
Figure 6B:
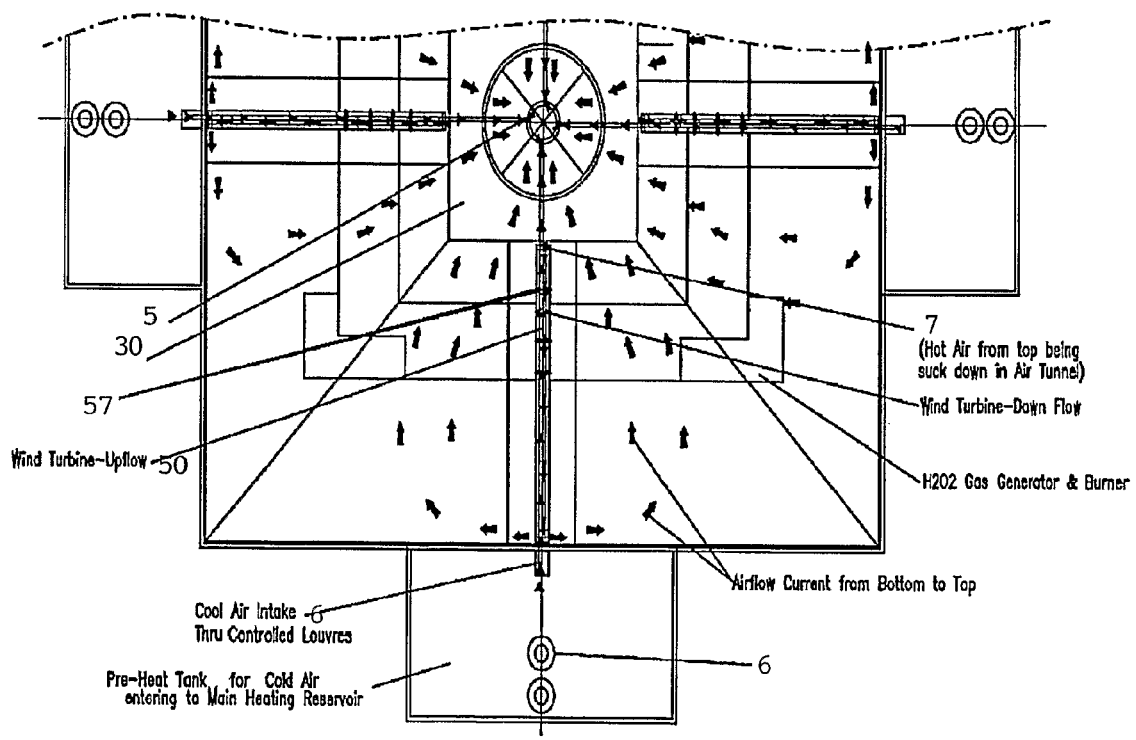
FIG. 6B is a plan view of the pyramid-like structure illustrating air movement described as the First method of Air Heating.

The air flow in the pyramid-like structure 1 giving rise to the First Method of Air Heating is described now with reference to FIG. 6.

1. $3^{rd}$ Heat Absorption and transfer Layer 42 of the angled side frames 2 of the pyramid-like structure 1 are steel and/or aluminum plates or other suitable metals. On a hot sunny day, the sun will heat up the steel plates. Heat will be transmitted through radiation or convection into the interior enclosed space of the pyramid. All the thermal heat is absorbed by $1^{st}$ Heating Layer 40 and transferred to $2^{nd}$ Heat Transfer Layer 41, $3^{rd}$ Heat Absorption and transfer Layer 42 and finally $4^{th}$ Heat retention Layer 43.

2. The pyramid-like structure 1 is designed to absorb as much heat as possible inside the enclosed space 34 of the pyramid-like structure 1. As the ambient temperature build up inside the enclosed space 34, the air in the enclosed space 34 is heated up. From trials conducted, the temperature could rise to as high as 70° C. or even higher.

3. Hot air rises and flows up to the top of the tip of the pyramid-like structure 1. A Main Air Vent 5 at the top of the pyramid-like structure 1 will then regulate the air flowing out into the open sky. Regulation of outflow of hot air is controlled via the system of controls.

4. At the lower end of the 4 side frames 2 of the pyramid-like structure 1 are cool air intake vents 6. These cool air intake vents 6 lead to the cool air tunnels 8 in the side air shaft 4. Four or more units of Side Air Shafts 4 are laid in the four side frames 2. At the top of the pyramid-like structure 1, are hot air intake vents 7. These lead to hot air tunnels 9 in the side air shafts 4. The Side Air shafts 4 have micro processor based controlled louvers 54 to regulate the intake of the air through hot air vents 7 near the top of the pyramid-like structure 1.

5. The Vertical Main Air Shaft 3 and the Side Air Shafts 4 are built as enclosed air tunnel shafts 8, 9 constructed by steel or concrete. A number of wind powered mini turbine 50 are fitted at intervals along these air tunnels 8, 9.

6. In the Vertical Main Air Shaft 3 at the top of the pyramid-like the wind powered turbines or wind blades with alternators 53 is several times larger than the mini-turbines 50 in the Side Intake Air Shafts 4. At the end of each wind powered turbine blade are a number of armatures or dynamos that will produce electricity upon each turn of the turbine blades.

7. The outside air is cooler than the air within the enclosed space 34 of the pyramid-like structure 1 and thus a differential in air pressure is created inside the enclosed space 34 as hot air is released from inside the pyramid-like structure 1. This draught can be monitored and controlled by the Monitoring System, through adjustment of louvres 54 at the top of the pyramid as well as at the base of the side air shafts 4.

8. The cool air tunnel 8 and hot air tunnel 9 in each of the Side Air Shaft 4 have different objectives. Fresh air is taken in from vents 7 at the top of the pyramid-like structure 1. As the top of the pyramid-like structure 1 is also the hottest, the air is being heated up as they are drawn into the air tunnels 8,9. The main object is to heat up the air as it passes down the air tunnels 8,9 while being suck down by the air impellers.

9. The hot air from the top of the pyramid-like structure 1 on reaching the bottom of the Hot Air tunnel 9 of each side air shaft 4, is further heated by the heat from Main Thermal Tank 20, increasing the temperature of the air. As hot air is lighter, it will automatically rise up upwards in the enclosed space 34 in the interior of the pyramid-like structure 1, thus ensuring a continuous flow of hot air needed to create an air pressure.

10. Fresh cool air is also drawn in through the Cool Air Vent 6 at the bottom of the Cool Air Tunnel 8, flowing up towards the Main Air Vent 5. Again, the exit of the warm air at the top end 13 of the Vertical Main Air Shaft 3 is designed at an angle. The exiting air will spin the Main Air Booster fan 15 at the top end of the Vertical Main Air Shaft 3. The Main Booster Fan 15 in turn drives another generator for production of electricity.

11. The Main object of controlling the release of the hot air through the Main Air Vent 5 is two fold. The first reason is to ensure that there are sufficient warm air being retained within the pyramid-like structure and with enough heated air capacity to last a working day. The second reason is there is no need to release the entire hot air but to regulate the turbine and motor speed. A standard motor will require between 500-1500 rpm to generate electricity depending on manufacturer's specification.

Figure 7A:
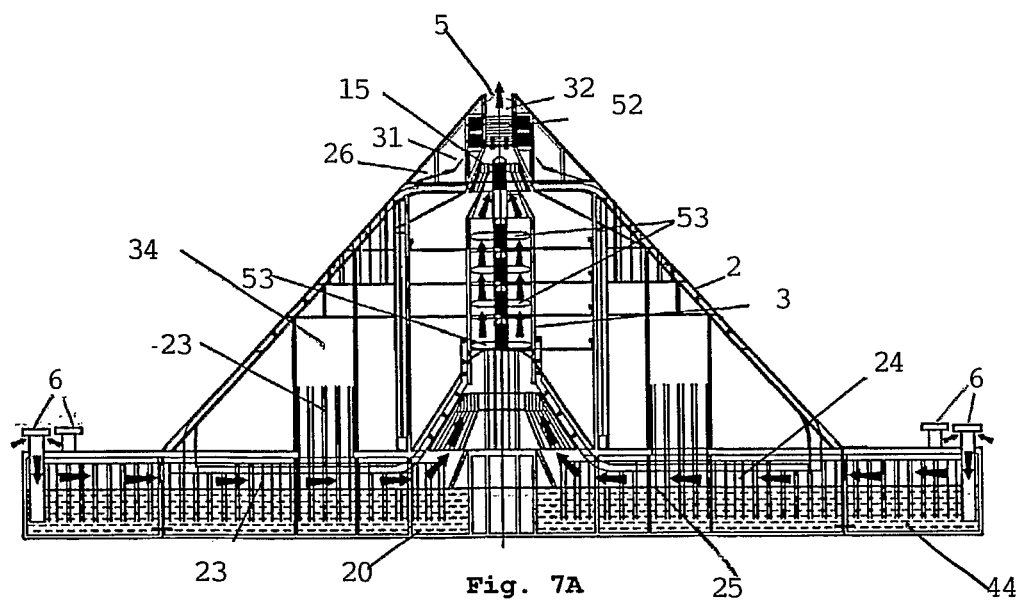
FIG. 7A is a cross section of a side elevation of the pyramid-like structure showing air movement described as the Second Method of Air Heating.

The air flow in the pyramid-like structure 1 giving rise to the Second Air Heating Process using Air flow from Main Thermal Reservoir is described now, with reference to FIG. 7A and FIG. 7 B.

1. Cool Air is drawn through the cool air intake vents 6 at the base of the pyramid-like structure. The cool air passes firstly via the Pre Heating Side Tanks 21 located outside the pyramid-like structure, then through a corridor of steel plates 24 in which the Main Thermal Tank 20 is situated.

2. The Pre Heating Side tanks 21 are installed with Heat fins 23 to warm up the air before the air continues to flow through the Main Thermal Tank 20.

3. The Main Thermal Tank 20 is also fitted with Heating fins 23 for the same purpose of heating the air as the air passes through the corridor of steel plates 24 leading to the Vertical Main Air Shaft 3.

Figure 7B:
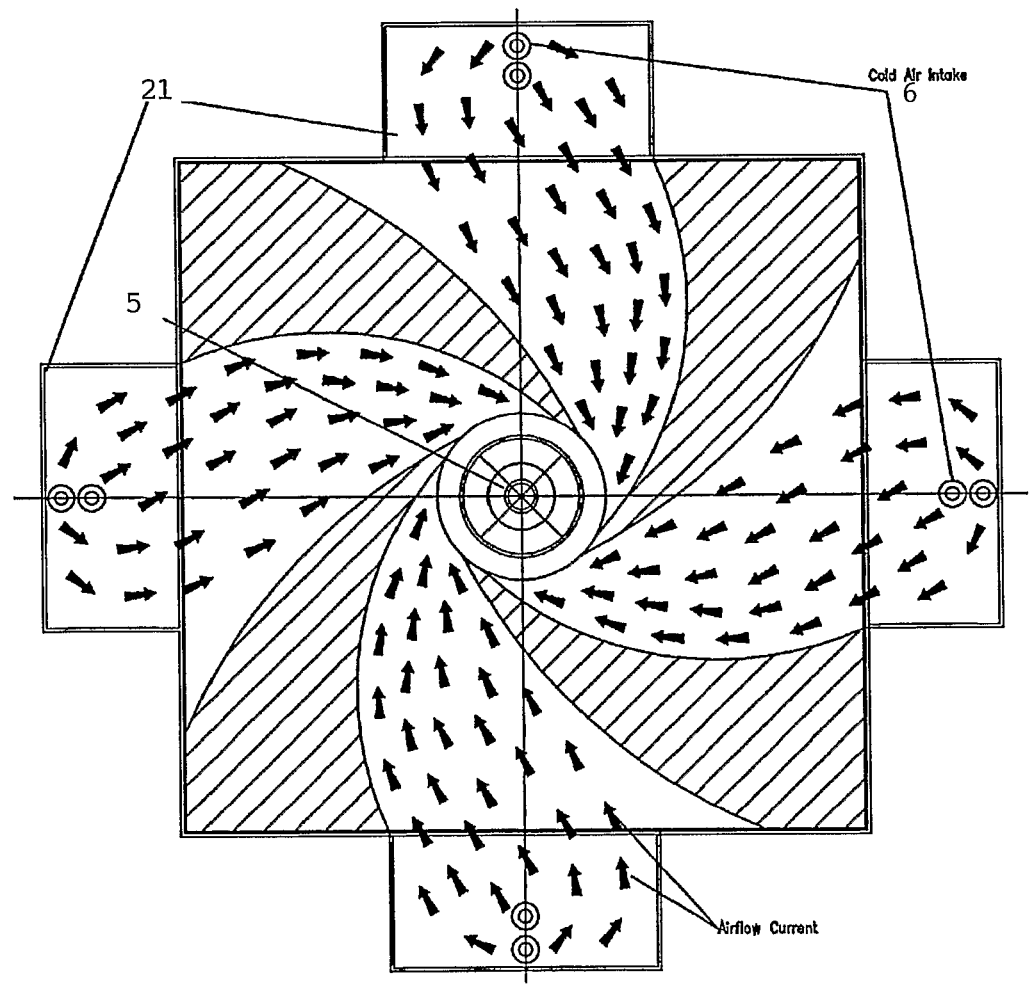
FIG. 7B is a plan view of the pyramid-like structure illustrating air movement described as the Second method of Air Heating.

4. The corridor of Steel plates 24 are placed strategically to ensure the flow of the hot air moves from the pre-heating tanks 21 along the corridor in a semi-circular motion and creating a hurricane like motion moving upwards into the enlarged base 11 of the Vertical Main Shaft 3, as shown in FIG. 7B.

5. At the bottom of the Vertical Main Air Shaft 3, the hot air heated by the heating fins 23 of Main Thermal Tank 20 is forced to converge into a cone shaped exit formed at the enlarged base 11 of the Vertical Main Air Shaft 3. The conical structure is designed as an inverted spiral staircase to create air turbulence as the hot air enters into the Vertical Main Air Shaft 3.

6. Inside the mid-section 12 of the Vertical Main Air Shaft 3, there are no less than four wind blades with alternators of which the first fan is designed as a Turbine blade type.

7. The design of the inverted spiral staircase at the enlarged base 11 at the bottom of the Vertical Main Air Shaft 3 ensures the hot air enters at an angle of 30-45 degree side ways or perpendicular to the Turbine blades. It is envisaged that the bottom of the Vertical Main Air Shaft 3 could also be fitted with wind turbines to harness the forces of the moving hot air going through the inverted spiral staircase.

8. The side air-jets will spin the Turbine blades of the $1^{st}$ Turbine blade. On the top of the blade fan, a specially designed contraption will create an air turbulence as the Turbine blades moves.

9. This will create wind reaction for moving fans 53 or other additional wind blades in the mid-section 12.

10. All the wind turbines or fans or mills are connected to a power generating unit 11. Hot air would exit the pyramid-like structure at the Main Air Vent 5, after passing through automated louvres 54. However, the Hot Air has to be firstly forced through a small aperture thus creating a Air Stream Jet. This will drive the Roof wind turbines 52 located at the top of the pyramid-like structure, generating additional power.

12. The Main Booster Fan 15 located on top of the Vertical Main Air Shaft 3 is designed to suck up air from the bottom of Vertical Main Air Shaft 3 thus ensuring a continuous air flow in the Main Air Shaft 3 for the Second Method of Air Heating.

Figure 8A:
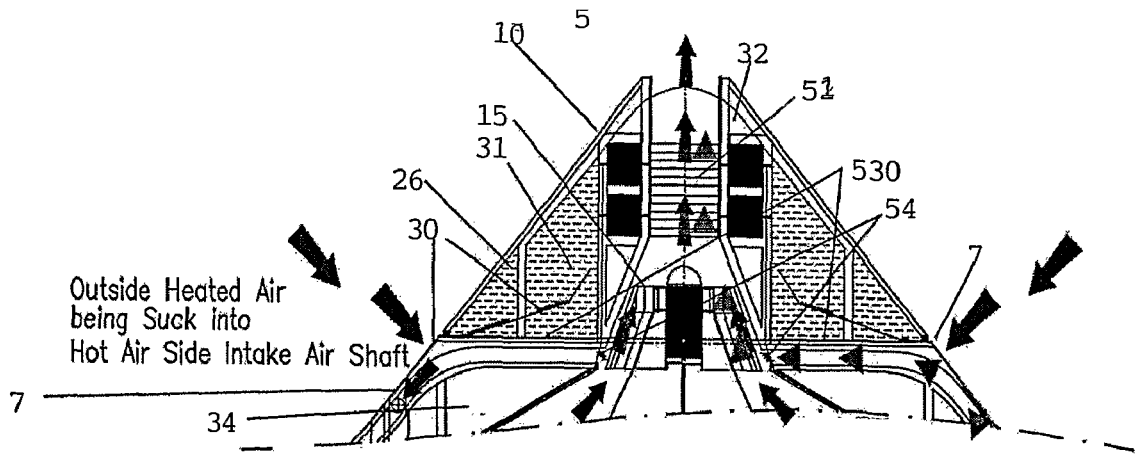
FIG. 8A is a side elevation view of the top of the pyramid-like structure.
Figure 8B:
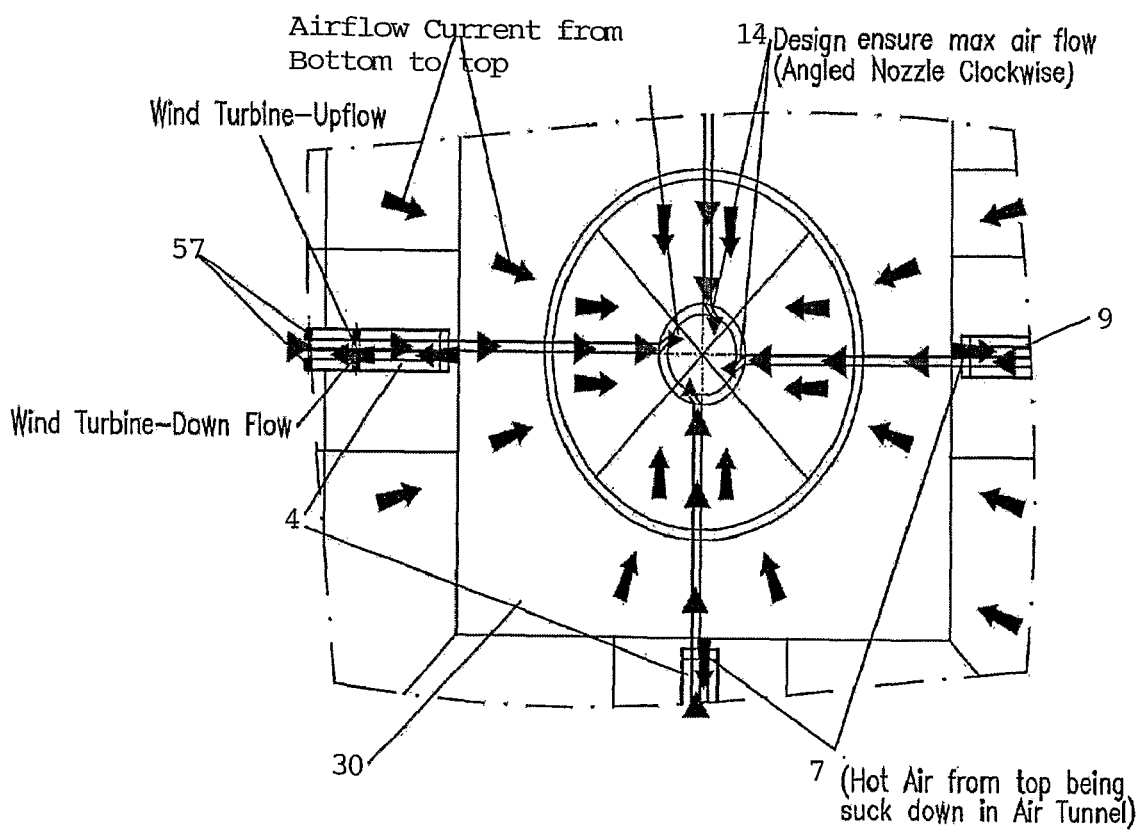
FIG. 8B is a cross section view of the top of the pyramid-like structure.

FIG. 8A shows a top side elevation view of the pyramid-like structure 1. FIG. 8B is a top plan view of the pyramid-like structure 1. The boiler system is positioned on top of the hot plate 30. In the center of the hot plate 30 is the opened top 13 of the Vertical Main Air Shaft. Cool air heated by the heating fins 23 of the Main Thermal Tank 20, sucked into the base of the pyramid under the Second Method of Air Heating would rush through the Vertical Main Air Shaft 3, turning the various wind blades with alternators/turbines 51 positioned inside the Vertical Main Air Shaft 3, and before exiting through the main air vent 5. At the base of the hot plate 30 are also the hot air vents 7 to the hot air tunnels 9 of the side air shafts 4, in which warm air from the atmosphere is drawn in. The warm air taken into the warm air tunnel 9 in the Side Air shafts 4 is the first step of the First Method of Air Heating. The warm air is then further warmed inside the enclosed space 34 of the pyramid-like structure 1, rising to the hot plate 30 neat the top of the pyramid-like structure 1. Special Main Booster fans 15 are installed at the automated louvres 54 to generate further power before allowing the warm air to exit through the main air vent 5. Roof wind turbines with alternators 52 are also installed before the opening of the Main Air Vent 5 again, to maximize power generation from the rushing warm air as it exits the pyramid-like structure 1.

Heat to boil the Heat Transfer Medium 44 such as water is drawn from the Main Thermal Tank 20, the heat stored in Hot Plate 30 as well as heat energy from parabolic reflectors 33 situated outside the pyramid-like structure and positioned to focus the heat energy on the boiler system.

The steam produced by the boiling Heat Transfer Medium 44 will be used for 2 processes—for desalination or used to drive steam turbine for additional power generation. In the desalination process, the boiler can be used to create steam but flowing downwards to a steam heat exchanger and a desalination system to desalinate seawater. For additional power generation, the steam can be used to drive a steam turbine located at the bottom of the pyramid-like structure 1. It is envisage that the steam produced may not be sufficient to drive a sizeable steam turbine and additional processes will be added to supercharge the steam. A typical equipment will be a gas fired burner.

FIG. 9 gives a diagrammatic representation of the movement of hot air and cool air through the side air shafts 4 and within the Vertical Main Air Shaft 3, described in relation to FIG. 8. The cold air taken through the side air shaft 4 is shown in triangles. The hot air taken into the pyramid-like structure 1 is represented by the arrows. The configuration of the metal pipes of $2^{nd}$ Layer 41 is shown herein, to illustrate how the thermal energy could either be transferred from the Heat Transfer Medium or fluid and taken through the network of pipes 36 laid out in the zig-zag pattern laid out on the side frame 2.

Figure 10:
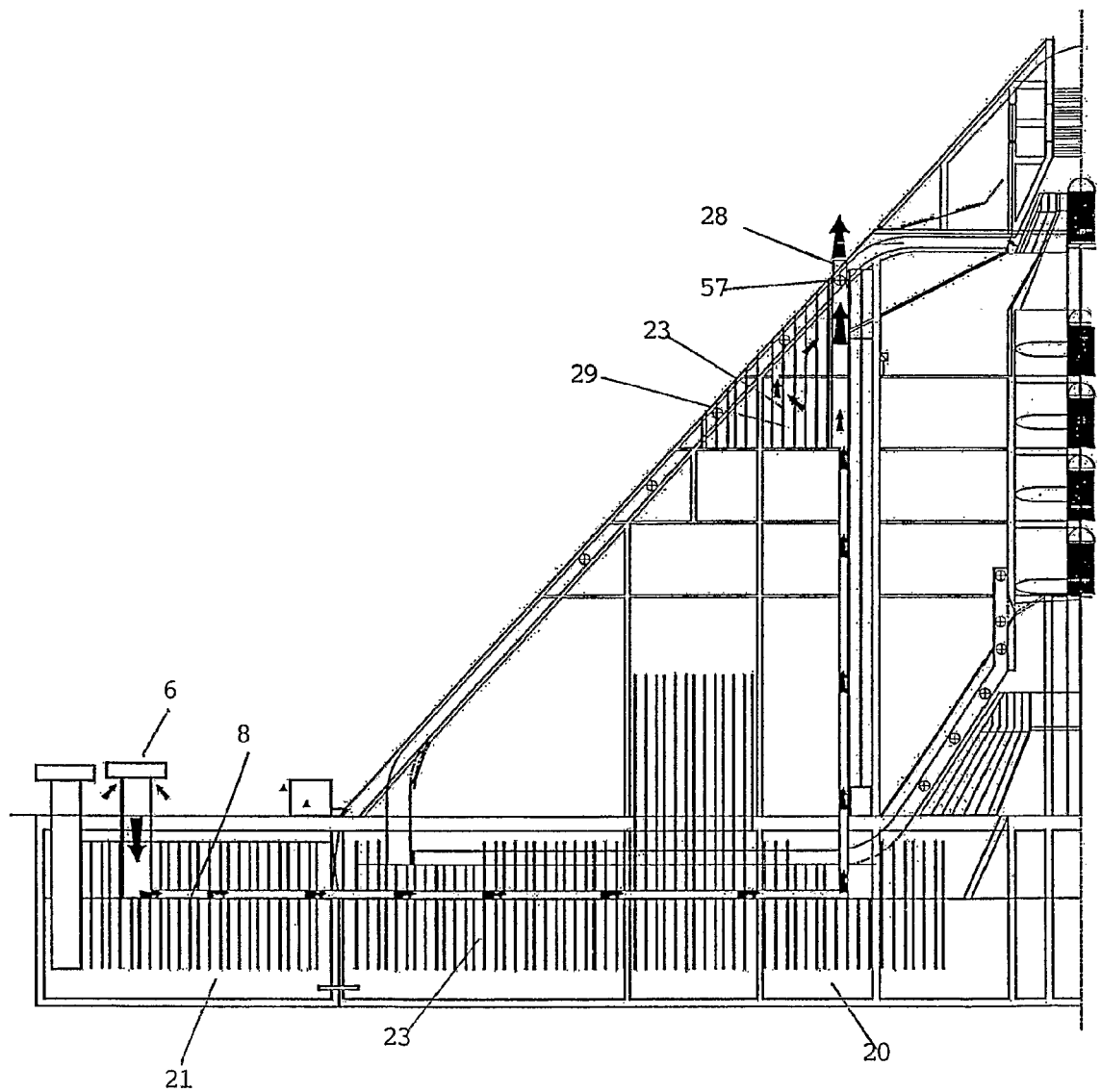
FIG. 10 is a side elevation view of the side and top of the pyramid-like structure illustrating air movement described as the Third method of Air Heating.

FIG. 10 gives a diagrammatic representation of the air flow in the pyramid-like structure giving rise to the Third Method of Air Heating which is now described.

The fresh cool air from the surrounding comes into the pyramid-like structure 1 through the cool air vent 6. The cool air then flows down a cool air tunnel 8 laid along the Main Thermal Reservoir. The cool air then gets heated by the heating fins 23 of the Main Thermal Reservoir as it moves along the cool air tunnel 8. The hot air then rises upwards towards the air chamber 29 located just below the hot plate 30. The air flow is very short and the process is to cool the openings at strategic location on the hot plate. This cooling method will then induce more heat to travel upwards faster creating more heat for the heating process outside and inside the pyramid-like structure 1.

At the opening where the hot air exits 28, a turbine is fitted with an alternator 57 to produce electricity. Or the other end, a suction fan is fitted at the entrance of a Hot air intake 7 of the side air shaft 4. This will force the outside air to be sucked into the Side Air Shaft 4 and into the interior of the pyramid-like structure 1. This process would enhance the air intake into the pyramid-like structure 1 since the hot air intake is rather long in design.

Power Generation in the Pyramid During the Night

The pyramid-like structure 1 will ensure continuous generation of electricity even if there is insufficient sunlight during the day or when the sun sets down and the night quickly turns very cool or even cold. This would be through the following method:

1. Beneath the pyramid-like structure 1, the Main Thermal tank 20 and Preheating side tanks 21 form a huge liquid thermal reservoir for heat absorption and retention. The capacity of this liquid thermal reservoir is based upon the power to be generated. According to computations, the reservoir would be conservatively sized at equal to or more than the volume of the pyramid.

2. In $3^{rd}$ Heat Absorption and transfer Layer 42 of the angled side frame 2 of the pyramid-like structure 1, the network of pipes 36 laid within $2^{nd}$ Heat Transfer Layer 41 are placed on top of the steel or aluminum plates or other suitable metals of $3^{rd}$ Heat absorption and transfer Layer 42. Heat Transfer Medium 44 or heat transfer fluid is pumped from the Main Thermal Reservoir slowly up to the top of the pyramid-like structure 1 and the Heat Transfer Medium 44 then flows back into this huge thermal reservoir 20, 21 through the network of pipes 36 located within $2^{nd}$ Heat Transfer Layer 41. During the day, the Heat Transfer Medium 44 flows down in the pipes 36 and the heat is absorbed into the Main Thermal Tank 20 and the process continues throughout the day.

3. The temperature of the liquid Thermal Heating Reservoir is maintained and controlled at a certain temperature at all times during the day.

4. Additional equipments may be required to heat the water in the liquid thermal reservoir if there is insufficient sunlight. A typical example is a gas fired burner operated by H202 which is produced by the electrolysis of water by electricity. Power is also generated freely by the mini-turbines 50 located in the side Air shafts 4.

5. In addition, the by-product and waste steam from the boiler system on the top of the pyramid-like structure 1 will be diverted and released into the Main Thermal Tank 20 to maximize heat transfer of the heat released from steam heat exchanger for the desalination process (not described herein) or from the steam generator.

6. In the evening when the outside temperature starts to cools down, it is expected that the internal temperature of the pyramid-like structure 1 will also starts to drop. As long as the internal temperature of the pyramid-like structure 1 is higher than the outside temperature, a temperature differential is maintained. The temperature differential causes a differential pressure giving rise to an artificial wind draught. The artificial wind draught drives the wind turbines, to generate electricity.

7. The Monitoring System will calculate and adjust the differential temperatures within the pyramid-like structure and the external temperature.

8. Heat exchangers or fins 23 are constructed and located inside the pyramid-like structure 1, besides those surrounding the Main Thermal Tank 20 and Pre Heat Side Tanks 21. These fins will maintain the 'heat' inside the enclosed space 34 inside the pyramid-like structure and by comparison to the external temperature, a differential temperature is being created. This is similar to the First Method of Air Heating in the day for heating the air in the pyramid-like structure 1.

9. In addition, the cold air during the night will be heated up in the Pre Heat Side tank 21 as the cold air passes through the air tunnels 8 with a series of heating fins 23 placed at the top of the Main Thermal Tank 20.

10. The high and low pressures will result in an artificial wind draught being created and the wind will flow into the air tunnels 8,9 in the side air shafts 4 to drive the mini turbines 50 and produce electricity.

11. For the process similar to Second Method of Air Heating Process in the day, the external air which is expected to be very cool or cold is drawn into a pre-heat Side tank 21, warmed up and then led to flow into the air passage along the Main Thermal Tank 20.

12. The Main Thermal Tank 20 is fitted with heat exchangers in the form of heating fins 23 on top of the Main Thermal Tank to transfer heat from the Main Thermal Tank 20 to the external air passing through.

13. The heated external air then flows along into the cone shaped entrance leading to the enlarged base 11 of the Vertical Main Air Shaft 3. The cone shaped entrance 11 is designed as an inverted spiral staircase to create air turbulence such that the hot air enters into the Vertical Main Air Shaft 3 with considerable force, driving the wind turbines, or wind blades with alternators 53 in the Vertical Main Air shaft 3.

14. The side air jets will spin the Turbine blades of the $1^{st}$ Turbine blade. On the top of the blade fan, a specially designed contraption will create an air turbulence as the Turbine blades moves.

15. This will create wind reaction for moving wind blades or fans with alternators 53 or other additional wind blade.

16. All the wind blades with alternators 53 are connected to a power generating unit.

17. Hot Air exiting from the Vertical Main Air Shaft 3 is also forced into a small aperture thus creating a Air Stream Jet. This will drive the Roof wind turbines with alternators 52 located at the top of the pyramid-like structure.

Pre Heating for Morning Use

Between the transition period from the early dawn i.e. in the wee hours of the day and when the sun begins to rise, the warm Heat Transfer Medium 44 stored in the Main Thermal Reservoir is pumped up to the Day tanks 26 at the top of the pyramid-like structure 1 to start heating up the 3$^{rd}$ Heat Absorption and Transfer Layer made of steel and/or aluminum or other suitable metals. This process will shorten the time for the sun to heat up the pyramid-like structure 1 and improve efficiency of the multi-systems of the pyramid-like structure 1.

Use of Excess Energy Generated

In the event excess power is not utilized, the monitoring system will divert the excess energy into two additional processes:
1. The excess energy will be stored into load banks (licensed under another invention) to store the power and to be released into the grid later on as and when the need arises.
2. The excess energy will be used to "crack" the potable water into Hydrogen and Oxygen molecules using a patented electrolysis process (also licensed under another invention). The gas generated from this electrolysis process shall be stored in special tanks and used as a fuel medium for firing the burners in the boilers for the desalination process or for additional heating of the water reservoir.

EMBODIMENTS

Although the pyramid-like structure described herein has a base with four sides and consequently four angled side frames, it is envisaged that the invention can possibly work with a three or four or more sided base and consequently three or four or more angled side frames.

The angle of the side frame to the base can vary from 30% to 80% as measured from the base, depending on location of project and sun's maximum azimuth.

The invention describes four layers within the angled side frame. It is envisaged that the angled side frame can have more layers, if necessary.

The invention is also not to be limited by the sequence of layers nor the composition of solar energy cells and thermal energy material in the first topmost layer.

The invention describes the use of water as a Heat Transfer Medium. Other suitable fluids could also be used as Heat Transfer Medium.

The invention also describes a network of pipes laid within the angled side frame. The invention is not to be limited by the configuration or the layout of the pipes.

The side air shafts has at least 1 air tunnel for intake and movement of cool air and at least 1 air tunnel for intake and movement of warm air. It is envisaged that the side air shafts can have more than 1 set of air tunnels for cool and warm air.

Although specific heat conducting materials and heat retention materials have been described herein as being used in the invention, these materials are not limiting and other suitable materials not listed herein could equally be used.

The width of the base and height of the structure depends on the power generation output.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

ADVANTAGEOUS EFFECTS OF THE INVENTION

The invention makes use of the thermal energy of the sun not only to generate power but to make potable water at the same time. The invention also takes full advantage of the thermal and light energy from the sun by using multi-systems to harness the power of the sun. As it uses multi-systems and makes full use of the thermal and light energy from the sun, the invention can be of a sufficient large scale for commercial production of power on a continuous basis, 24 hours a day and 7 times a week. At the same time, the invention has the capacity to process sea water by connection to a desalination system to produce potable water, if desired.

The novelty of the invention is that upon the Main Thermal Reservoir being energized as a hot water bath, the invention will be operational on an automated mode almost perpetually as the heat from the heating fins inside the pyramid will warm the interior of the pyramid effortlessly thus creating an artificial airflow continuously inside the pyramid. This in turn drives the Main Booster Fan on top of the Vertical Main Air Shaft and creating a vacuum in the Vertical Main Air Shaft, ensuring the heated air passes through the steel plates in the corridor before flowing upwards into the Vertical Main Air Shaft, the process continues without climatic or human intervention.

Also, this invention only needs some 50 gallons of distilled water daily in the production of $H_2O_2$ for combustion in the $H_2O_2$ boiler system.

The invention can be located anywhere where there is sufficient sunlight and a small pool of water. However, this invention can be designed to be constructed on roof tops of buildings and in remote areas without the need of additional fossil or polluting fuels. Again, this invention allows small and compact power or water units to be constructed anywhere around the world even if there is no or little sunlight so long as the Main Thermal Tank is energized by additional heating methods before the system is operational. Also this invention will remove the need for a National Transmission Grid for power and water as each power or water unit can be decentralized and constructed as the need arises in each village, township or city, resulting in huge savings of billions of dollars annually in each country which uses the subject invention for electricity generation and water desalination.

Finally the invention allows large scale commercial production of electricity and potable water using solar and thermal energy on a continuous 24/7 basis without any harmful by products associated with other types of power generation.

The invention claimed is:

1. A pyramid-like structure including a base and 3 or more side frames, each side frame forming an angle to the base, the pyramid-like structure having an enclosed space within, the pyramid-like structure comprising:
   an accumulator-conductor of thermal energy, said accumulator-conductor having a collector of solar energy;
   an air suction means to take surrounding external air into the enclosed space;
   a plurality of wind turbines;
   a plurality of day tanks located near the top of the pyramid-type structure;
   a main thermal reservoir in fluid communication with said plurality of day tanks;

a system for storage of a heat transfer medium, and heating of said heat transfer medium by the accumulator-conductor said system adapted to provide circulation of said heat transfer medium between said main thermal reservoir, the plurality of day tanks and the accumulator-conductor;

a boiler system in communication with the plurality of day tanks to apply heat to the heat transfer medium within the plurality of day tanks; and a system of controls for working of the pyramid-like structure characterized in that the accumulator-conductor is adapted to heat both air within the enclosed space of the pyramid and to heat the air within the air suction means, said wind turbines arranged to receive a flow of air resulting from said heat applied by the accumulator-conductor to the enclosed space and suction means.

2. The pyramid-like structure as claimed in claim 1, wherein the accumulator-conductor including at least three layers of heat absorbing materials and a bottom layer of heat retention material, the three layers of heat absorbing materials including a 1st heating layer as the outermost layer, a 2nd heat transfer layer below the 1st heating layer, a 3rd heat absorption to transfer layer below the 2nd transfer layer, and a bottom layer of heat retention material being a 4th heat retention layer.

3. The pyramid-like structure as claimed in claim 2, wherein the collector includes the 1st heating layer.

4. The pyramid-like structure as claimed in claim 2 wherein the 1st heating layer includes a layer of glass panels or other transparent material such as transparent polycarbonate.

5. The pyramid-like structure as claimed in claim 4, wherein the 1st heating layer includes a transparent material such as transparent polycarbonate solar cells.

6. The pyramid-like structure as claimed in claim 4 wherein the 1st heating layer includes convex lenses to concentrate light beams.

7. The pyramid-like structure as claimed in claim 2, wherein the 2nd heat transfer layer including a network of metal pipes, wherein at least one pipe could be used to carry heat transfer medium, at least one pipe for carrying treated water and at least one pipe for carrying other heat transfer fluids.

8. The pyramid-like structure as claimed in claim 2, wherein the 3rd heat absorption and transfer layer includes thermal conductive metal plates adapted for heat absorption and transfer characteristic.

9. A 4th heat retention layer of an accumulator-conductor of thermal energy for the pyramid-like structure as claimed in claim 2, wherein the 4th heat retention layer includes insulation materials to absorb thermal heat transferred from the 1st heating layer, 2nd heat transfer layer and 3rd heat absorption and transfer layer.

10. The pyramid-like structure as claimed in claim 2, wherein the 1st heating layer, the 2nd heat transfer layer, the 3rd heat absorption and transfer layer and the 4th heat retention layer forms part of the cross section of the side frame.

11. The pyramid-like structure as claimed in claim 1, wherein the air suction means includes a vertical main air shaft, a side air shaft on each side frame and a cool air tunnel along the main thermal reservoir.

12. The pyramid-like structure as claimed in claim 11, wherein the vertical main air shaft having a top end near the top of the pyramid-like structure, a mid-section having a plurality of wind turbines and an enlarged circular base, also having a wind turbine.

13. The pyramid-like structure as claimed in claim 12, wherein the top end is cone-shaped and has automated louvres.

14. The pyramid-like structure as claimed in claim 12, wherein the top end of the vertical main air shaft is located within a hot plate.

15. The pyramid-like structure as claimed in claim 12, wherein the top end of the vertical main air shaft leads through the hot plate, to a main air vent.

16. The pyramid-like structure as claimed in claim 12, wherein the base is in the form of an inverted spiral staircase, the spiral staircase formed at an angle in the range of 30-45 degrees sideways or perpendicular to the turbine blades of the wind turbine at the base.

17. The pyramid-like structure as claimed in claim 12, wherein the side air shaft includes a vent for intake of cool air connected to a cool air tunnel for passage of cool air and a vent for intake of hot air connected to a hot air tunnel for passage of hot air.

18. The pyramid-like structure as claimed in claim 17, wherein the cool air tunnel and hot air tunnel includes a plurality of wind turbines spaced apart to generate electricity as air passes through the tunnels.

19. The pyramid-like structure as claimed in claim 18, wherein the air tunnels are constructed of concrete and/or steel.

20. The pyramid-like structure as claimed in claim 11, wherein the cool air tunnel includes cool air vents for intake of cool air from outside of said pyramid-like structure, a mid section of the cool air tunnel laid along the main thermal reservoir which leads to a vertical air tunnel in the enclosed space of the pyramid-like, said vertical air tunnel passing through a hot air chamber before exiting through a hot air exit near the top of the pyramid-like structure.

21. The pyramid-like structure as claimed in claim 1, further including a main thermal reservoir connected to a plurality of pre-heat side tanks, balancing tank and an intake for heat transfer medium and a pipe and pumps to circulate the heat transfer medium up to a plurality of day tanks near the top of the pyramid-like structure and down from the day tanks through a network of pipes of 2nd heat transfer layer, the heat transfer medium absorbing thermal energy and also transferring thermal energy from the 1st heating layer to the 3rd heat absorption and transfer layer, before the heat transfer medium flows back to the main thermal reservoir.

22. The pyramid-like structure as claimed in claim 21, wherein the main thermal reservoir is located at the base of the pyramid-like structure.

23. The pyramid-like structure as claimed in claim 21 wherein the main thermal reservoir is located directly below the enlarged circular base of the vertical main air shaft.

24. The pyramid-like structure as claimed in claim 21, wherein the main thermal reservoir having steel plates placed such that air flowing through the main thermal reservoir and upwards through the vertical main air shaft causes the moving air to be turbulent in a semi-circular motion creating a hurricane like motion moving upwards the enlarged circular base of the vertical main air shaft.

25. The pyramid-like structure as claimed in claim 7 wherein the network of pipes includes pipes for the heat transfer medium such as fresh water and pipes for other heat transfer fluids.

26. The pyramid-like structure as claimed in claim 25, wherein the network of pipes is laid side by side within 1st heating layer and 3rd heat absorption and transfer layer inside the side frame.

27. The pyramid-like structure as claimed in claim 25, wherein the network of pipes is laid side by side in a zigzag pattern within layer 1 and layer 3 of the side frame so as to maximize the time taken for the heat transfer medium to flow through the pipes.

28. The pyramid-like structure as claimed in claim 1, wherein the heat transfer medium being fresh water or treated water.

29. The pyramid-like structure as claimed in claim 1, wherein the heat transfer medium being a liquid with good thermal retention characteristics.

30. The pyramid-like structure as claimed in claim 1, wherein the boiler system includes a boiler on top of a hot plate and a steam chamber for receiving the steam produced by the boiler for further use of the steam.

31. The pyramid-like structure as claimed in claim 1, further including a plurality of external parabolic reflectors near the base of the pyramid-like structure positioned so that sunlight is directed towards the hot plate to heat the heat transfer medium in the boiler.

32. The pyramid-like structure as claimed in claim 30, wherein the hot plate is a flat horizontal area containing the boiler system.

33. The pyramid-like structure as claimed in claim 1, wherein the system of controls including controls for movement of air, movement of heat transfer medium, seawater and potable water and controls for monitoring the operation of the various systems and temperature of the heat transfer medium, surrounding air, seawater and other heat transfer fluids.

34. The pyramid-like structure as claimed in claim 33, further including a system of control for controlling automated louvres.

35. The pyramid-like structure as claimed in claim 33, wherein the system of controls include pumps and flow regulators.

36. The pyramid-like structure as claimed in claim 33, wherein the controls are operated with instructions from a computer or other electrical/electronic devices.

37. The pyramid-like structure as claimed in claim 1 wherein the turbines include mini-turbines installed in a spaced arrangement in the hot air tunnels and cool air tunnels, wind turbines of various sizes located at intervals in the mid section of the vertical main air shaft and a main booster fan at the exit of the top end of the vertical main air shaft.

38. A first air heating method for generating electricity for the pyramid-like structure as claimed in claim 1, the method comprising the steps of:
taking cool air from outside the pyramid-like structure through the cool air vents into the cool air tunnels;
talking warm air from outside the pyramid-like structure through the hot air vents into the hot air tunnels;
heating the cool air in the cool air tunnels by the heat transferred from 1st heating layer and heat from 3rd heat absorption and transfer layer;
heating the warm air in the hot air tunnels by the heat transferred from 1st heating layer and heat from 3rd heat absorption and transfer layer;
exiting the heated air from the cool air tunnels and hot air tunnels at the base of the pyramid-like structure, the heated air rising upwards in the enclosed space of the pyramid-like structure,
further heating the heated air by the heat retained in 4th heat retention layer within the Side Frame,
congregating the heated air near the hot plate;
causing a temperature differential between the heated air near the hot plate and the surrounding air outside the pyramid-like structure,
creating a continuous flow of hot air into the hot air tunnels and cool air tunnels, as a result of the temperature differential, and;
turning the mini-turbines in the hot air tunnels and cool air tunnels.

39. The method, as claimed in claim 38 wherein the hot air exiting through louvres at the hot plate passes through wind turbines and main booster fan further generating electricity.

40. The method, as claimed in claim 38 wherein the louvres at the hot plate for passage of exit of hot air are controlled by the controls for movement of air.

41. A second air heating method for generating electricity in a pyramid-like structure as claimed in claim 1 comprising the steps of:
taking heat transfer medium through an intake to a main thermal reservoir at the base of the pyramid to hold the heat transfer medium; said thermal reservoir having heat fins on its sides and on its top; taking cool air from the exterior of the pyramid structure through a plurality of cool air intake vents installed around the base of the structure;
passing the cool air through a series of heat fins on a plurality of preheat side tanks at each side of the base of the pyramid; said preheat side tanks connected to the main thermal reservoir and having heat fins on its sides and on its top;
converging said hot air into the inverted spiral staircase of the vertical main air shaft;
creating an air turbulence with hot air exiting from the inverted spiral staircase at an angle of 30-45 degrees side ways to the turbine blades in the vertical main air shaft, to turn the wind powered turbines in the vertical main air shaft for the generation of electricity;
further passing the hot air through the mid-section of the vertical main air shaft having a plurality of wind turbines;
further turning the plurality of wind turbines for generation of additional electricity before the hot air exits from the top of the Main Vertical Air Shaft.

42. The method as claimed in claim 41 further including the step of:
sucking the hot air exiting from the top of the vertical main air shaft out by a main booster Fan on the top of the pyramid-like structure.

43. A third air heating method for generating electricity for the pyramid-like structure as claimed in claim 1, the method comprising the steps of:
taking cool air from the surrounding through the cool air vents into the cool air tunnels;
heating the cool air being heated up in the cool air tunnels located along the main thermal reservoir;
the heated air rising vertically upwards in the vertical portion of the cool air tunnels within the enclosed space of the pyramid-like structure, further heated by the heating fins in the enclosed space of the pyramid-like structure;
congregating of the heated air near a hot air chamber beneath the hot plate, then
exiting the heated air through a hot air exit, causing a temperature differential between the heated air near the hot plate and the surrounding air outside the pyramid-like structure;

the temperature differential creating a continuous flow of cool air into the cool air tunnels, turning an alternator at the hot air exit, to generate electricity.

44. The method according to claim 41 wherein during the transition period from the early dawn to when the sun begins to rise, warm heat transfer medium from the main thermal reservoir is pumped up to the top of the pyramid-like structure and then allowed to flow down the network of pipes to start heating up the steel and/or aluminum of the 3rd heat absorption and transfer layer within the side frame, to shorten the time for the sun to heat up the pyramid-like structure and improve efficiency of the first air heating method and second air heating method.

* * * * *